United States Patent
Toth et al.

(10) Patent No.: US 11,036,838 B2
(45) Date of Patent: Jun. 15, 2021

(54) PROCESSING AUTHENTICATION REQUESTS TO SECURED INFORMATION SYSTEMS USING MACHINE-LEARNED USER-ACCOUNT BEHAVIOR PROFILES

(71) Applicant: Bank of America Corporation, Charlotte, NC (US)

(72) Inventors: Michael E. Toth, Charlotte, NC (US); Xianhong Zhang, Issaquah, WA (US); Hitesh Shah, Seattle, WA (US); Srinivasa Rao Goriparthi, Bellevue, WA (US)

(73) Assignee: Bank of America Corporation, Charlotte, NC (US)

( * ) Notice: Subject to any disclaimer, the term of this patent is extended or adjusted under 35 U.S.C. 154(b) by 223 days.

(21) Appl. No.: 16/210,062

(22) Filed: Dec. 5, 2018

(65) Prior Publication Data
US 2020/0184051 A1    Jun. 11, 2020

(51) Int. Cl.
*G06F 21/31* (2013.01)
*G06F 21/41* (2013.01)
(Continued)

(52) U.S. Cl.
CPC ............ *G06F 21/316* (2013.01); *G06F 21/41* (2013.01); *G06N 20/00* (2019.01); *H04L 63/0876* (2013.01); *H04L 63/0892* (2013.01)

(58) Field of Classification Search
CPC ........ G06F 21/316; G06F 21/41; G06F 21/32; G06N 20/00; H04L 63/0892;
(Continued)

(56) References Cited

U.S. PATENT DOCUMENTS 7,647,645 B2   1/2010 Edeki et al.
8,079,079 B2  12/2011 Zhang et al.
(Continued)

OTHER PUBLICATIONS

Dec. 9, 2020 U.S. Notice of Allowance and Fees Due—U.S. Appl. No. 16/210,042.
(Continued)

*Primary Examiner* — Chau Le
*Assistant Examiner* — Han Yang
(74) *Attorney, Agent, or Firm* — Banner & Witcoff, Ltd.; Michael A. Springs

(57) ABSTRACT

Aspects of the disclosure relate to processing authentication requests to secured information systems using machine-learned user-account behavior profiles. A computing platform may receive an authentication request corresponding to a request for a user of a client computing device to access one or more secured information resources associated with a user account. The computing platform may capture one or more behavioral parameters and activity data associated with one or more interactions with one or more non-authenticated pages. Then, the computing platform may evaluate the one or more behavioral parameters and the activity data using a behavioral profile associated with the user account. Based on this evaluation, the computing platform may identify the authentication request as malicious and may generate and send one or more denial-of-access commands to prevent the client computing device from accessing the one or more secured information resources associated with the user account.

20 Claims, 16 Drawing Sheets

(51) Int. Cl.
*G06N 20/00* (2019.01)
*H04L 29/06* (2006.01)
(58) Field of Classification Search
CPC ............. H04L 63/0876; H04L 63/1425; H04L 63/0861; H04L 63/102; H04W 12/00503; H04W 12/63
See application file for complete search history.

(56) References Cited

U.S. PATENT DOCUMENTS

| | | |
|---|---|---|
| 8,627,438 B1 | 1/2014 | Bhimanaik |
| 9,203,829 B1 | 12/2015 | Levine et al. |
| 9,396,332 B2 | 7/2016 | Abrams et al. |
| 9,509,688 B1 | 11/2016 | Magi Shaashua et al. |
| 9,536,072 B2 | 1/2017 | Guedalia et al. |
| 9,692,740 B2 | 6/2017 | Hitchcock et al. |
| 10,292,051 B2 | 5/2019 | Kusens et al. |
| 2007/0289024 A1 | 12/2007 | Mohammed |
| 2009/0089625 A1 | 4/2009 | Kannappan et al. |
| 2009/0100136 A1 | 4/2009 | Jarenskog et al. |
| 2009/0119763 A1 | 5/2009 | Park et al. |
| 2012/0233665 A1 | 9/2012 | Ranganathan et al. |
| 2012/0260322 A1 | 10/2012 | Logan et al. |
| 2012/0323686 A1 | 12/2012 | Burger et al. |
| 2013/0117831 A1 | 5/2013 | Hook et al. |
| 2014/0020073 A1 | 1/2014 | Ronda et al. |
| 2014/0101055 A1 | 4/2014 | Grissom et al. |
| 2015/0256337 A1 | 9/2015 | Nguyen et al. |
| 2016/0092870 A1 | 3/2016 | Salama et al. |
| 2016/0094546 A1 | 3/2016 | Innes et al. |
| 2016/0239649 A1 | 8/2016 | Zhao |
| 2016/0277481 A1 | 9/2016 | Yang |
| 2016/0381080 A1 | 12/2016 | Reddem et al. |
| 2017/0041296 A1 | 2/2017 | Ford et al. |
| 2017/0048252 A1 | 2/2017 | Straub et al. |
| 2017/0078225 A1 | 3/2017 | Pandey et al. |
| 2017/0227995 A1 | 8/2017 | Lee et al. |
| 2017/0230344 A1 | 8/2017 | Dhar et al. |
| 2017/0244757 A1 | 8/2017 | Castinado et al. |
| 2017/0317993 A1 | 11/2017 | Weber et al. |
| 2017/0331816 A1* | 11/2017 | Votaw ..................... G06F 21/34 |
| 2017/0346821 A1 | 11/2017 | Yedidi et al. |
| 2018/0007553 A1 | 1/2018 | Dutt et al. |
| 2018/0020009 A1 | 1/2018 | Wei et al. |
| 2018/0063122 A1 | 3/2018 | Enoki et al. |
| 2018/0131685 A1 | 5/2018 | Sridhar et al. |
| 2018/0139199 A1 | 5/2018 | Ahuja et al. |
| 2018/0164959 A1 | 6/2018 | Gupta et al. |
| 2018/0167816 A1* | 6/2018 | Kusens ............... H04L 63/0861 |
| 2018/0183586 A1 | 6/2018 | Bhargav-Spantzel et al. |
| 2018/0234464 A1 | 8/2018 | Sim et al. |
| 2018/0249285 A1 | 8/2018 | Shaw et al. |
| 2018/0249292 A1 | 8/2018 | Skaaksrud |
| 2018/0251132 A1 | 9/2018 | Phelan |
| 2018/0253682 A1 | 9/2018 | Gilman et al. |
| 2018/0253713 A1 | 9/2018 | Ready et al. |
| 2018/0253718 A1 | 9/2018 | Khan et al. |
| 2018/0253840 A1 | 9/2018 | Tran |
| 2018/0254101 A1 | 9/2018 | Gilmore et al. |
| 2018/0255000 A1 | 9/2018 | Castinado et al. |
| 2018/0255060 A1 | 9/2018 | Bansal |
| 2018/0255084 A1 | 9/2018 | Kotinas et al. |
| 2018/0255422 A1 | 9/2018 | Montemurro et al. |
| 2018/0255456 A1 | 9/2018 | Yin et al. |
| 2018/0260384 A1 | 9/2018 | Pasupalak et al. |
| 2018/0260553 A1 | 9/2018 | Hoyos et al. |
| 2018/0260641 A1 | 9/2018 | Yadhunandan et al. |
| 2018/0260743 A1 | 9/2018 | Block et al. |
| 2018/0261060 A1 | 9/2018 | Siminoff et al. |
| 2018/0261126 A1 | 9/2018 | Rios et al. |
| 2018/0262388 A1 | 9/2018 | Johnson et al. |
| 2018/0262529 A1 | 9/2018 | Allen |
| 2018/0262597 A1 | 9/2018 | Matthieu et al. |
| 2018/0262620 A1 | 9/2018 | Wolthuis et al. |
| 2018/0262810 A1 | 9/2018 | Cronk et al. |
| 2018/0262909 A1 | 9/2018 | Roller et al. |
| 2018/0264347 A1 | 9/2018 | Tran et al. |
| 2018/0268015 A1 | 9/2018 | Sugaberry |
| 2018/0268408 A1 | 9/2018 | Botros et al. |
| 2018/0268632 A1 | 9/2018 | Malhotra |
| 2018/0268674 A1 | 9/2018 | Siminoff |
| 2018/0268691 A1 | 9/2018 | Meredith et al. |
| 2018/0268818 A1 | 9/2018 | Schoenmackers et al. |
| 2018/0268944 A1 | 9/2018 | Prakash |
| 2018/0269554 A1 | 9/2018 | Sanford |
| 2018/0269927 A1 | 9/2018 | Gerszberg et al. |
| 2018/0270276 A9 | 9/2018 | Logue et al. |
| 2018/0270549 A1 | 9/2018 | Awiszus et al. |
| 2018/0270608 A1 | 9/2018 | Thoresen et al. |
| 2018/0270612 A1 | 9/2018 | Thoresen et al. |
| 2018/0274876 A1 | 9/2018 | Stewart et al. |
| 2018/0275765 A1 | 9/2018 | Roth et al. |
| 2018/0276041 A1 | 9/2018 | Bansal et al. |
| 2018/0276205 A1 | 9/2018 | Auger |
| 2018/0276261 A1 | 9/2018 | Smart |
| 2018/0276495 A1 | 9/2018 | Yu et al. |
| 2018/0276710 A1 | 9/2018 | Tietzen et al. |
| 2018/0278496 A1 | 9/2018 | Kulshreshtha et al. |
| 2018/0278597 A1 | 9/2018 | Helms et al. |
| 2018/0278648 A1 | 9/2018 | Li et al. |
| 2018/0278740 A1 | 9/2018 | Choi et al. |
| 2018/0301148 A1 | 10/2018 | Roman et al. |
| 2018/0301149 A1 | 10/2018 | Roman et al. |
| 2018/0302284 A1 | 10/2018 | Roman et al. |
| 2018/0302285 A1 | 10/2018 | Roman et al. |
| 2018/0302362 A1 | 10/2018 | Abedini et al. |
| 2018/0302363 A1 | 10/2018 | Abedini et al. |
| 2018/0302418 A1 | 10/2018 | Scasny |
| 2018/0302420 A1 | 10/2018 | Nakanelua et al. |
| 2018/0302423 A1 | 10/2018 | Muddu et al. |
| 2018/0302425 A1 | 10/2018 | Esman, Sr. et al. |
| 2018/0307303 A1 | 10/2018 | Powderly et al. |
| 2018/0307399 A1 | 10/2018 | Sandilya et al. |
| 2018/0307908 A1 | 10/2018 | O'Brien et al. |
| 2018/0307909 A1 | 10/2018 | O'Brien et al. |
| 2018/0308073 A1 | 10/2018 | Kurian et al. |
| 2018/0308100 A1 | 10/2018 | Haukioja et al. |
| 2018/0308473 A1 | 10/2018 | Scholar |
| 2018/0309752 A1 | 10/2018 | Villavicencio et al. |
| 2018/0310159 A1 | 10/2018 | Katz et al. |
| 2018/0314689 A1 | 11/2018 | Wang et al. |
| 2018/0315110 A1 | 11/2018 | Kannan et al. |
| 2018/0315499 A1 | 11/2018 | Appelbaum et al. |
| 2018/0316852 A1 | 11/2018 | Graham et al. |
| 2018/0317146 A1 | 11/2018 | Fitzpatrick |
| 2018/0320967 A1 | 11/2018 | Kaloudis et al. |
| 2018/0321185 A1 | 11/2018 | Bantas et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2018/0322419 A1 | 11/2018 | Bugenhagen |
| 2018/0322436 A1 | 11/2018 | Sotiroudas et al. |
| 2018/0322879 A1 | 11/2018 | Bhaya et al. |
| 2018/0322961 A1 | 11/2018 | Kim et al. |
| 2018/0326150 A1 | 11/2018 | Davis et al. |
| 2018/0326291 A1 | 11/2018 | Tran et al. |
| 2018/0329738 A1 | 11/2018 | Kasha et al. |
| 2018/0329744 A1 | 11/2018 | Shear et al. |
| 2018/0330000 A1 | 11/2018 | Noble et al. |
| 2018/0330059 A1 | 11/2018 | Bates et al. |
| 2018/0330248 A1 | 11/2018 | Burhanuddin et al. |
| 2018/0330417 A1 | 11/2018 | Wollmer et al. |
| 2018/0332132 A1 | 11/2018 | Sampath et al. |
| 2018/0335776 A1 | 11/2018 | Theis et al. |
| 2018/0336638 A1 | 11/2018 | Dziabiak et al. |
| 2018/0336639 A1 | 11/2018 | Dziabiak et al. |
| 2018/0336640 A1 | 11/2018 | Dziabiak et al. |
| 2018/0336641 A1 | 11/2018 | Dziabiak et al. |
| 2018/0336905 A1 | 11/2018 | Kim et al. |
| 2018/0337966 A1 | 11/2018 | Pearl et al. |
| 2018/0338120 A1 | 11/2018 | Lemberger et al. |
| 2018/0338330 A1 | 11/2018 | Ledvina et al. |
| 2019/0028462 A1 | 1/2019 | Ishikawa et al. |

(56) References Cited

U.S. PATENT DOCUMENTS

| | | | |
|---|---|---|---|
| 2019/0057386 A1 | 2/2019 | Fazeli et al. | |
| 2019/0166112 A1 | 5/2019 | Gordon et al. | |
| 2019/0166485 A1 | 5/2019 | Namiranian | |
| 2019/0190704 A1 | 6/2019 | Srivastava et al. | |
| 2019/0220583 A1 | 7/2019 | Douglas et al. | |
| 2019/0245848 A1 | 8/2019 | Divoux et al. | |
| 2019/0332691 A1 | 10/2019 | Beadles et al. | |
| 2019/0372968 A1 | 12/2019 | Balogh et al. | |
| 2019/0392162 A1 | 12/2019 | Stern et al. | |
| 2020/0007530 A1 | 1/2020 | Mohamad Abdul et al. | |
| 2020/0162454 A1 | 5/2020 | Jain et al. | |
| 2020/0184048 A1* | 6/2020 | Toth | G06F 21/6218 |
| 2020/0184049 A1* | 6/2020 | Toth | G06F 21/316 |
| 2020/0184050 A1* | 6/2020 | Toth | H04L 63/0876 |
| 2020/0184065 A1* | 6/2020 | Toth | G06F 21/45 |
| 2020/0186518 A1* | 6/2020 | Shah | H04L 67/06 |
| 2020/0235933 A1 | 7/2020 | Redkokashin | |

OTHER PUBLICATIONS

Dec. 11, 2020 U.S. Non-Final Office Action—U.S. Appl. No. 16/210,010.

Nov. 23, 2020 U.S. Notice of Allowance and Fees Due—U.S. Appl. No. 16/210,092.

Dec. 7, 2020 U.S. Notice of Allowance and Fees Due—U.S. Appl. No. 16/210,028.

"Baseline Information Security Standard," University of Colorado Office of Information Security, revised 2013 Sep. 12, retrieved from https://www.cu.edu/security/system-wide-baseline-security-standards, 28 pages.

Aug. 4, 2020 U.S. Non-Final Office Action—U.S. Appl. No. 16/210,028.

Aug. 13, 2020 U.S. Non-Final Office Action—U.S. Appl. No. 16/210,117.

Dec. 15, 2020 U.S. Notice of Allowance and Fees Due—U.S. Appl. No. 16/210,117.

* cited by examiner

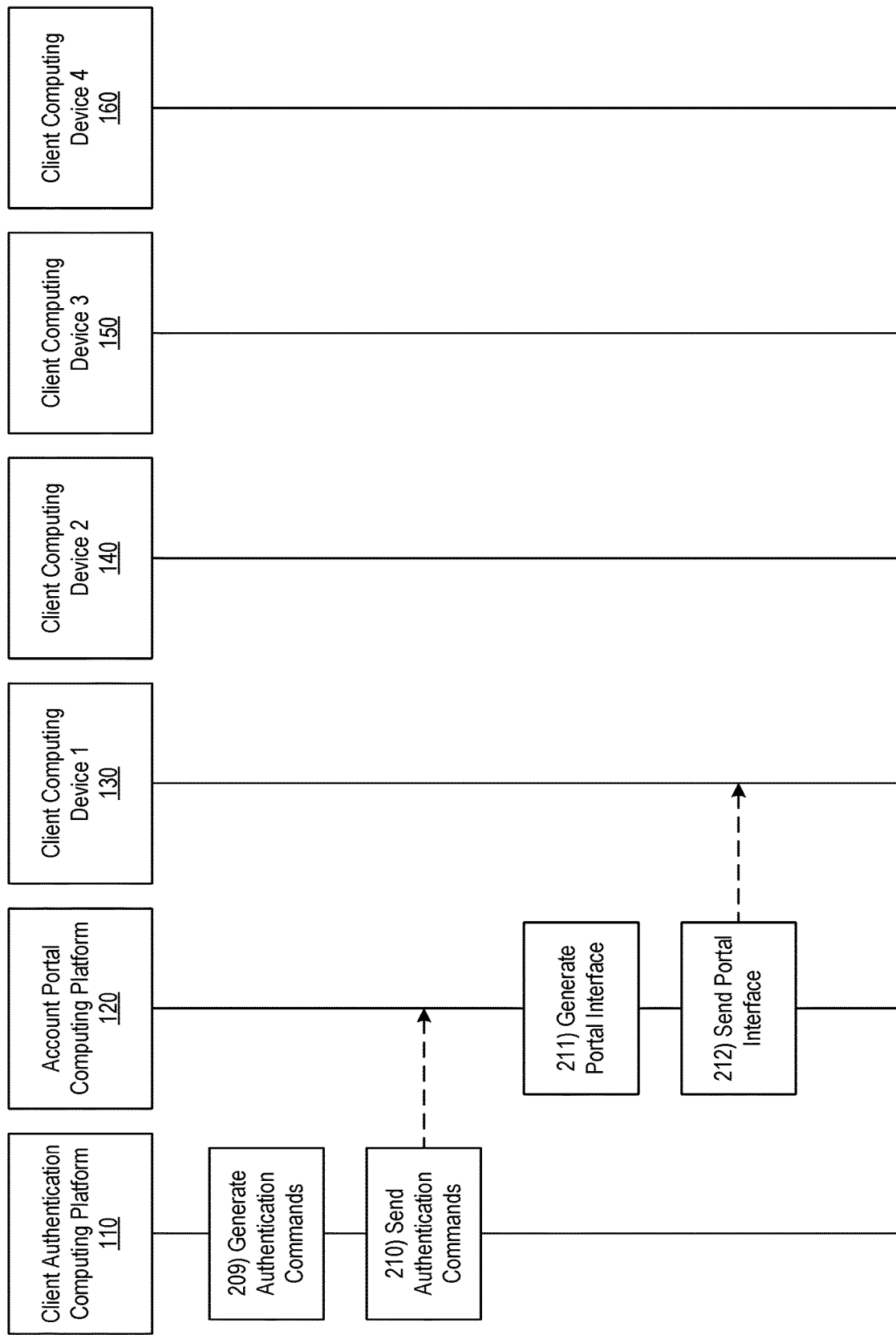

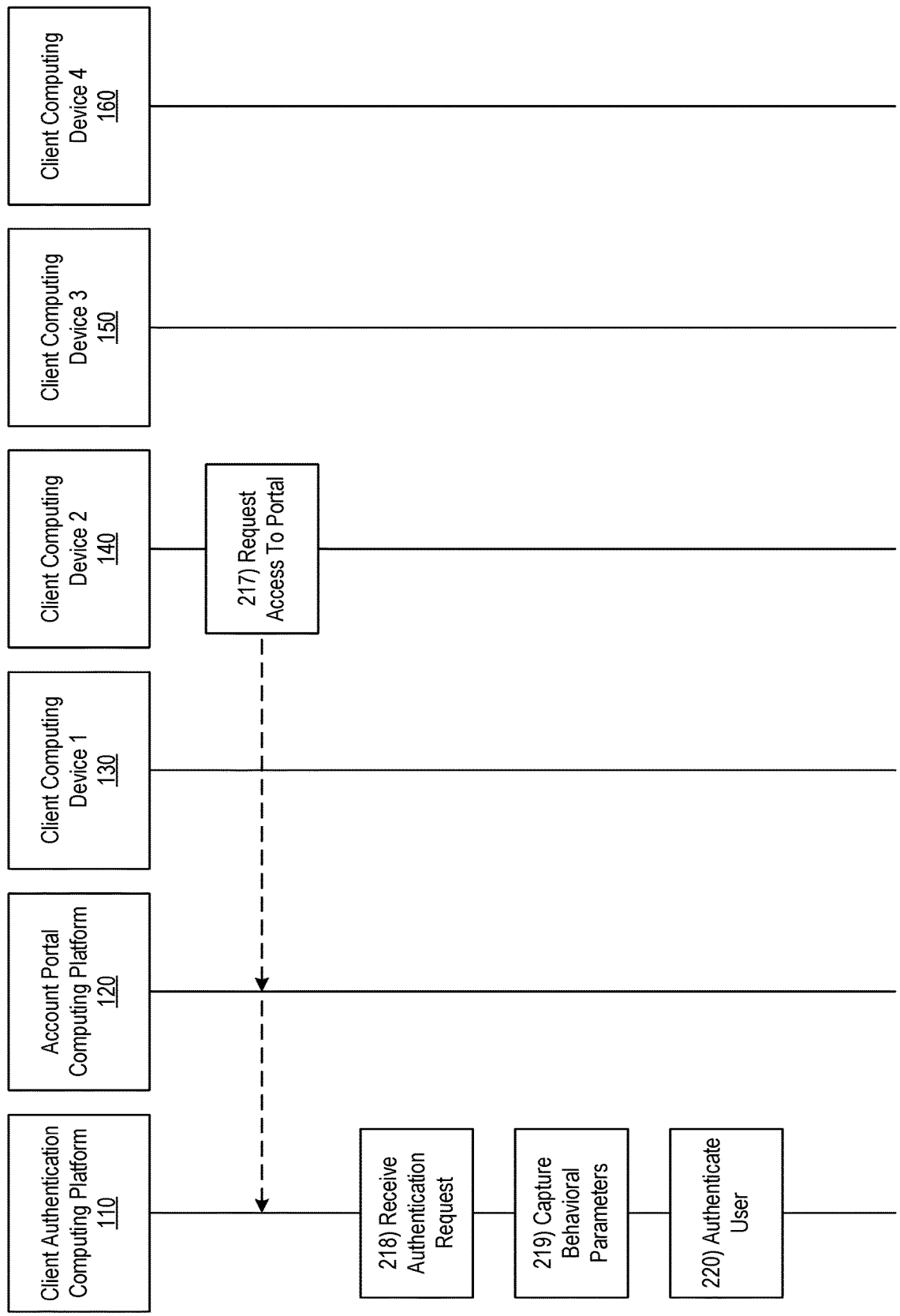

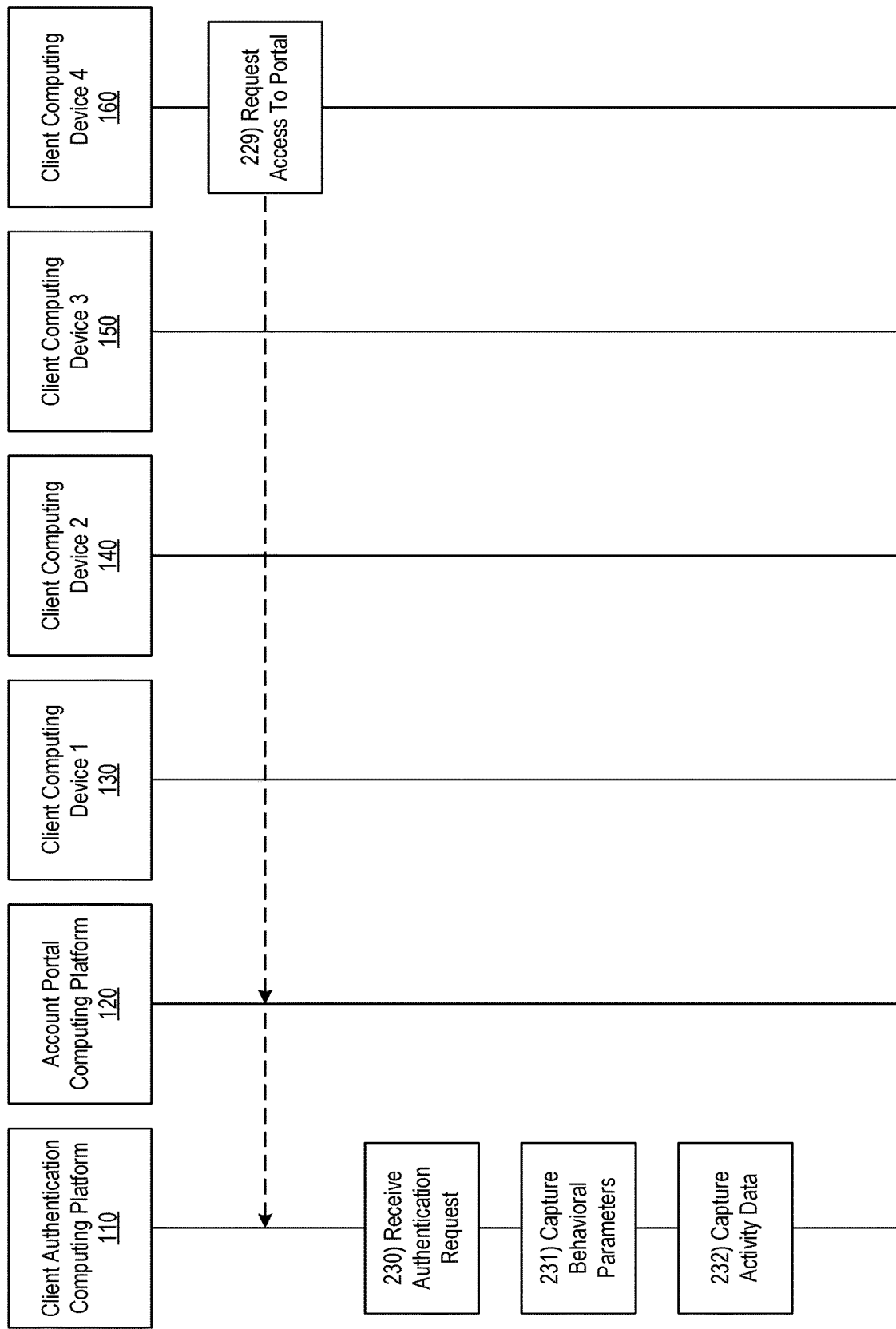

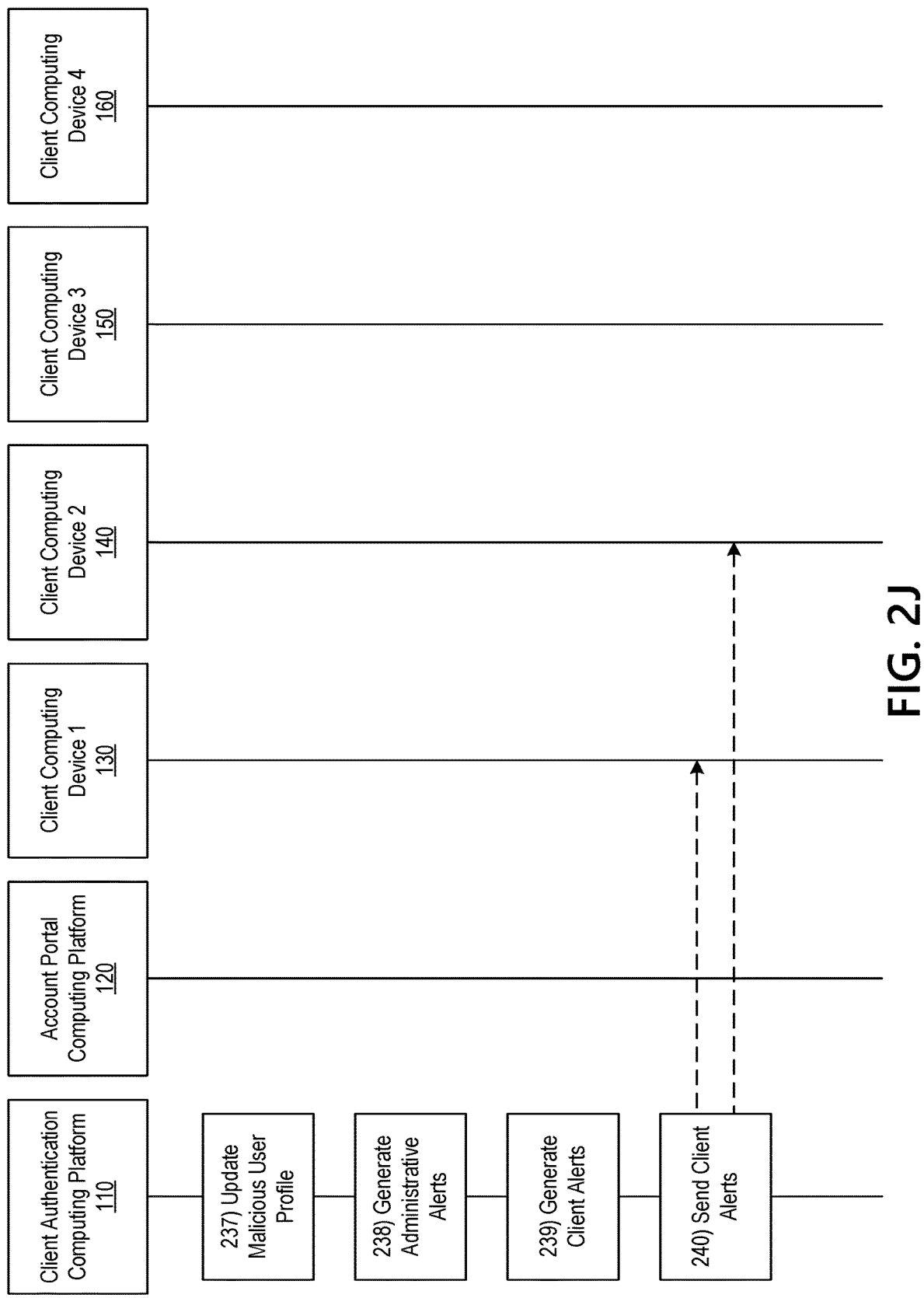

Administrator Portal
*Behavioral Profile 1*

| Channels | Data AAA |
|---|---|
| Events | Data BBB |
| Triggers | Data CCC |
| Biometrics | Data DDD |
| External | Data EEE |

Back | More Details

FIG. 3

Account Portal Interface
*Client Computing Device 2*

You have been granted access to User Account 1.

View Account Information

Create/Manage Funds Transfer

Access Online Bill Pay Menu

Help | More Options ...

Close

FIG. 4

PROCESSING AUTHENTICATION REQUESTS TO SECURED INFORMATION SYSTEMS USING MACHINE-LEARNED USER-ACCOUNT BEHAVIOR PROFILES

BACKGROUND

Aspects of the disclosure relate to providing information security and preventing unauthorized access to resources of an information system. In particular, one or more aspects of the disclosure relate to preventing unauthorized access to information resources by processing authentication requests to secured information systems using machine-learned user-account behavior profiles.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by using machine-learned user-account behavior profiles in processing authentication requests.

In accordance with one or more embodiments, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. Based on receiving the first authentication request from the account portal computing platform, the computing platform may capture one or more behavioral parameters associated with the first client computing device. Subsequently, the computing platform may authenticate the first user of the first client computing device to the first user account based on the one or more behavioral parameters associated with the first client computing device and one or more authentication credentials associated with the first authentication request. Based on authenticating the first user of the first client computing device to the first user account, the computing platform may generate one or more authentication commands directing the account portal computing platform to allow access to the one or more secured information resources associated with the first user account in the first client portal session. Subsequently, the computing platform may send, via the communication interface, to the account portal computing platform, the one or more authentication commands directing the account portal computing platform to allow access to the one or more secured information resources associated with the first user account in the first client portal session. After sending the one or more authentication commands directing the account portal computing platform to allow access to the one or more secured information resources associated with the first user account in the first client portal session, the computing platform may capture first activity data associated with one or more interactions in the first client portal session. Subsequently, the computing platform may update a first behavioral profile associated with the first user account based on the first activity data associated with the one or more interactions in the first client portal session.

In some embodiments, capturing the one or more behavioral parameters associated with the first client computing device may include capturing one or more of a device identifier associated with the first client computing device, device settings information associated with the first client computing device, device location information associated with the first client computing device, or at least one network address associated with the first client computing device.

In some embodiments, capturing the one or more behavioral parameters associated with the first client computing device may include capturing second activity data associated with one or more interactions by the first client computing device with one or more non-authenticated pages hosted by the account portal computing platform.

In some embodiments, authenticating the first user of the first client computing device to the first user account may include validating one or more authentication credentials associated with the first authentication request. In some embodiments, authenticating the first user of the first client computing device to the first user account may include: evaluating the one or more behavioral parameters associated with the first client computing device; and determining that the one or more behavioral parameters associated with the first client computing device are valid based on evaluating the one or more behavioral parameters associated with the first client computing device.

In some embodiments, capturing the first activity data associated with the one or more interactions in the first client portal session may include receiving information identifying one or more requests received from the first client computing device in the first client portal session, information identifying an order of the one or more requests received from the first client computing device in the first client portal session, and information identifying a timing of the one or more requests received from the first client computing device in the first client portal session.

In some embodiments, the computing platform may evaluate the information identifying the one or more requests received from the first client computing device in the first client portal session, the information identifying the order of the one or more requests received from the first client computing device in the first client portal session, and the information identifying the timing of the one or more requests received from the first client computing device in the first client portal session based on the first behavioral profile associated with the first user account. Based on evaluating the information identifying the one or more requests received from the first client computing device in the first client portal session, the information identifying the order of the one or more requests received from the first client computing device in the first client portal session, and the information identifying the timing of the one or more requests received from the first client computing device in the first client portal session, the computing platform may continue to allow access to the one or more secured information resources associated with the first user account in the first client portal session.

In some embodiments, the first behavioral profile associated with the first user account may include channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile.

In some embodiments, updating the first behavioral profile associated with the first user account based on the first activity data associated with the one or more interactions in the first client portal session may include updating the channel information associated with the channels dimension of the first behavioral profile, the event information associated with the events dimension of the first behavioral profile, the trigger information associated with the triggers dimension of the first behavioral profile, the biometric information associated with the biometrics dimension of the first behavioral profile, and the external information associated with the external dimension of the first behavioral profile.

In some embodiments, the channel information associated with the channels dimension of the first behavioral profile may include first channel activity information identifying actions involving the first user account across one or more internal channels and second channel activity information identifying actions involving the first user account across one or more external channels. In some embodiments, the event information associated with the events dimension of the first behavioral profile may identify at least one user-specific event that is automatically executable based on at least one trigger. In some embodiments, the trigger information associated with the triggers dimension of the first behavioral profile may identify at least one user-specific condition set that invokes automatic execution of at least one user-specific event. In some embodiments, the biometric information associated with the biometrics dimension of the first behavioral profile may include biometric activity information identifying biometric login actions involving the first user account. In some embodiments, the external information associated with the external dimension of the first behavioral profile may include one or more of user-specific social data or user-specific digital health data.

In some embodiments, the computing platform may receive, via the communication interface, from the account portal computing platform, a second authentication request corresponding to a request for a second user of a second client computing device to access one or more secured information resources associated with the first user account in a second client portal session. Based on receiving the second authentication request from the account portal computing platform, the computing platform may capture one or more behavioral parameters associated with the second client computing device. Subsequently, the computing platform may authenticate the second user of the second client computing device to the first user account based on the one or more behavioral parameters associated with the second client computing device and one or more authentication credentials associated with the second authentication request. Based on authenticating the second user of the second client computing device to the first user account, the computing platform may generate one or more authentication commands directing the account portal computing platform to allow access to the one or more secured information resources associated with the first user account in the second client portal session. Subsequently, the computing platform may send, via the communication interface, to the account portal computing platform, the one or more authentication commands directing the account portal computing platform to allow access to the one or more secured information resources associated with the first user account in the second client portal session. After sending the one or more authentication commands directing the account portal computing platform to allow access to the one or more secured information resources associated with the first user account in the second client portal session, the computing platform may capture second activity data associated with one or more interactions in the second client portal session. Subsequently, the computing platform may update the first behavioral profile associated with the first user account based on the second activity data associated with the one or more interactions in the second client portal session.

In accordance with one or more additional or alternative embodiments, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. Based on receiving the first authentication request from the account portal computing platform, the computing platform may capture one or more behavioral parameters associated with the first client computing device. Subsequently, the computing platform may capture first activity data associated with one or more interactions by the first client computing device with one or more non-authenticated pages hosted by the account portal computing platform. Then, the computing platform may evaluate the one or more behavioral parameters associated with the first client computing device and the first activity data based on a first behavioral profile associated with the first user account. Based on evaluating the one or more behavioral parameters associated with the first client computing device and the first activity data, the computing platform may identify the first authentication request as malicious. Based on identifying the first authentication request as malicious, the computing platform may generate one or more denial-of-access commands directing the account portal computing platform to prevent the first client computing device from accessing the one or more secured information resources associated with the first user account. Subsequently, the computing platform may send, via the communication interface, to the account portal computing platform, the one or more denial-of-access commands directing the account portal computing platform to prevent the first client computing device from accessing the one or more secured information resources associated with the first user account.

In some embodiments, capturing the one or more behavioral parameters associated with the first client computing device may include capturing one or more of a device identifier associated with the first client computing device, device settings information associated with the first client computing device, device location information associated with the first client computing device, or at least one network address associated with the first client computing device.

In some embodiments, capturing the first activity data associated with the one or more interactions by the first client computing device with the one or more non-authenticated pages hosted by the account portal computing platform may include receiving information identifying one or more requests received from the first client computing device, information identifying an order of the one or more requests received from the first client computing device, and information identifying a timing of the one or more requests received from the first client computing device.

In some embodiments, evaluating the one or more behavioral parameters associated with the first client computing device and the first activity data based on the first behavioral profile associated with the first user account may include: calculating one or more first distance values between the one or more behavioral parameters associated with the first client computing device and corresponding parameters of the first behavioral profile; calculating one or more second distance values between one or more activity parameters associated with the first activity data and corresponding parameters of the first behavioral profile; comparing the one or more first distance values to at least one predefined behavioral difference threshold; comparing the one or more second distance values to at least one predefined activity difference threshold; determining that the one or more first distance values exceed the at least one predefined behavioral difference threshold or that the one or more second distance values exceed the at least one predefined activity difference threshold; and responsive to determining that the one or more first distance values exceed the at least one predefined behavioral difference threshold or that the one or more second distance values exceed the at least one predefined activity difference threshold, determining to identify the first authentication request as malicious.

In some embodiments, the first behavioral profile associated with the first user account may include channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile.

In some embodiments, the channel information associated with the channels dimension of the first behavioral profile may include first channel activity information identifying actions involving the first user account across one or more internal channels and second channel activity information identifying actions involving the first user account across one or more external channels. In some embodiments, the event information associated with the events dimension of the first behavioral profile may identify at least one user-specific event that is automatically executable based on at least one trigger. In some embodiments, the trigger information associated with the triggers dimension of the first behavioral profile may identify at least one user-specific condition set that invokes automatic execution of at least one user-specific event. In some embodiments, the biometric information associated with the biometrics dimension of the first behavioral profile may include biometric activity information identifying biometric login actions involving the first user account. In some embodiments, the external information associated with the external dimension of the first behavioral profile may include one or more of user-specific social data or user-specific digital health data.

In some embodiments, identifying the first authentication request as malicious may include initiating execution of one or more automatically triggered events defined by event information and trigger information associated with the first behavioral profile associated with the first user account.

In some embodiments, identifying the first authentication request as malicious may include: comparing the one or more behavioral parameters associated with the first client computing device and the first activity data to one or more malicious-user profiles; and based on comparing the one or more behavioral parameters associated with the first client computing device and the first activity data to the one or more malicious-user profiles, selecting a malicious-user profile from the one or more malicious-user profiles as a matching profile.

In some embodiments, sending the one or more denial-of-access commands to the account portal computing platform may cause the account portal computing platform to terminate a connection with the first client computing device. In some embodiments, sending the one or more denial-of-access commands to the account portal computing platform may cause the account portal computing platform to connect the first client computing device to a honeypot site.

In some embodiments, the computing platform may update at least one malicious-user profile of a plurality of malicious-user profiles based on the one or more behavioral parameters associated with the first client computing device and the first activity data.

In some embodiments, based on identifying the first authentication request as malicious, the computing platform may generate one or more administrative alerts. In addition, the computing platform may send, via the communication interface, to an administrative computing device, the one or more administrative alerts, and sending the one or more administrative alerts to the administrative computing device may cause the administrative computing device to present at least one graphical user interface comprising information associated with at least one malicious-user profile associated with the first authentication request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for processing authentication requests to secured information systems using machine-learned user-account behavior profiles in accordance with one or more example embodiments;

FIGS. 3, 4, 5, and 6 depict example graphical user interfaces for processing authentication requests to secured information systems using machine-learned user-account behavior profiles in accordance with one or more example embodiments;

DETAILED DESCRIPTION

Figure 1A:
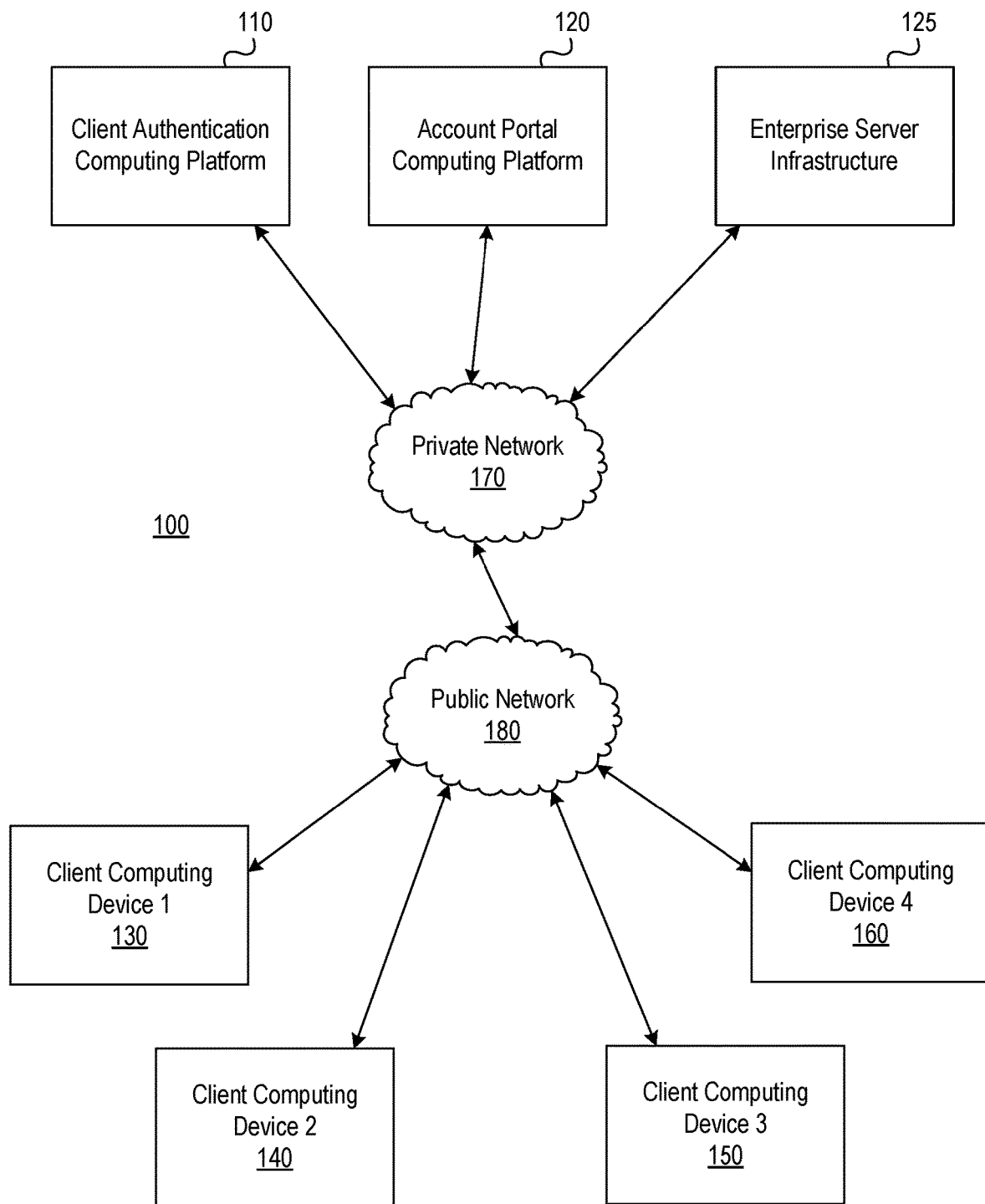
FIGS. 1A and 1B depict an illustrative computing environment for processing authentication requests to secured information systems using machine-learned user-account behavior profiles in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to implementing advanced user behavioral profiles to control authentication requests. For example, an individual user's behavior profile may capture "normal" historical behavior and associated actions across a defined set of dimensions: (1) Channels; (2) Events; (3) Triggers; (4) Biometrics; and (5) Other Parameters. For instance, data associated with the Channels dimension may capture a user's activity across various internal channels (e.g., online banking, mobile banking, IVR, contact center, financial center, or the like) and/or external channels (e.g., interactions with other banks and/or organizations, based on data received via data sharing services and/or relationships). Data associated with the Events dimension may capture user-specific events that may be automatically initiated by a machine-learning system based on particular triggers. For example, based on a particular user-specific trigger being activated, one or more user-specific events may be initiated (e.g., counter-attacking a malicious system or service, linking a particular device to a known or existing group of malicious users or devices, executing reverse phishing actions, generating notifications, implementing functional limits on transfers or other transactions that may be conducted, sending preventative alerts, or the like). Data associated with the Triggers dimension may capture user-specific thresholds and/or other conditions that may trigger particular events. For instance, based on user-specific events and/or risk-state information, a request may be allowed, denied, or challenged. Different and/or multiple layers of challenges may be implemented depending on user-specific risk state (e.g., multi-factor authentication, challenge questions, or the like). Data associated with the Biometrics dimension may capture user-specific biometrics (which may, e.g., include validation data associated with a particular user's authentication biometrics, a particular user's history or frequency of using particular biometrics to authenticate, or the like). For instance, such data may include information associated with fingerprint biometrics, facial biometrics, voice biometrics, cadence biometrics, behavioral biometrics, retina biometrics, health biometrics, heart rate biometrics, ECG biometrics, chemical biometrics, or the like. Data associated with the Other dimension may capture other customer-specific data that may be evaluated for authentication purposes. For instance, such data may include social data (which may, e.g., include social networking handles, social feed content, personal assets identified in social feeds, social preferences such as likes and dislikes, social posting behavior, social shopping behavior, or the like), digital health data (which may, e.g., be captured by a customer's linked wearable device), and/or non-customer identifiers (e.g., phone numbers or the like associated with non-registered customers who utilize bank services, such as cash checking). In some aspects, known malicious user profiles may be created across the same set of dimensions as the customer profiles discussed above, and such profiles may be used to recognize and/or otherwise identify malicious attempts to access secured systems.

Figure 1B:
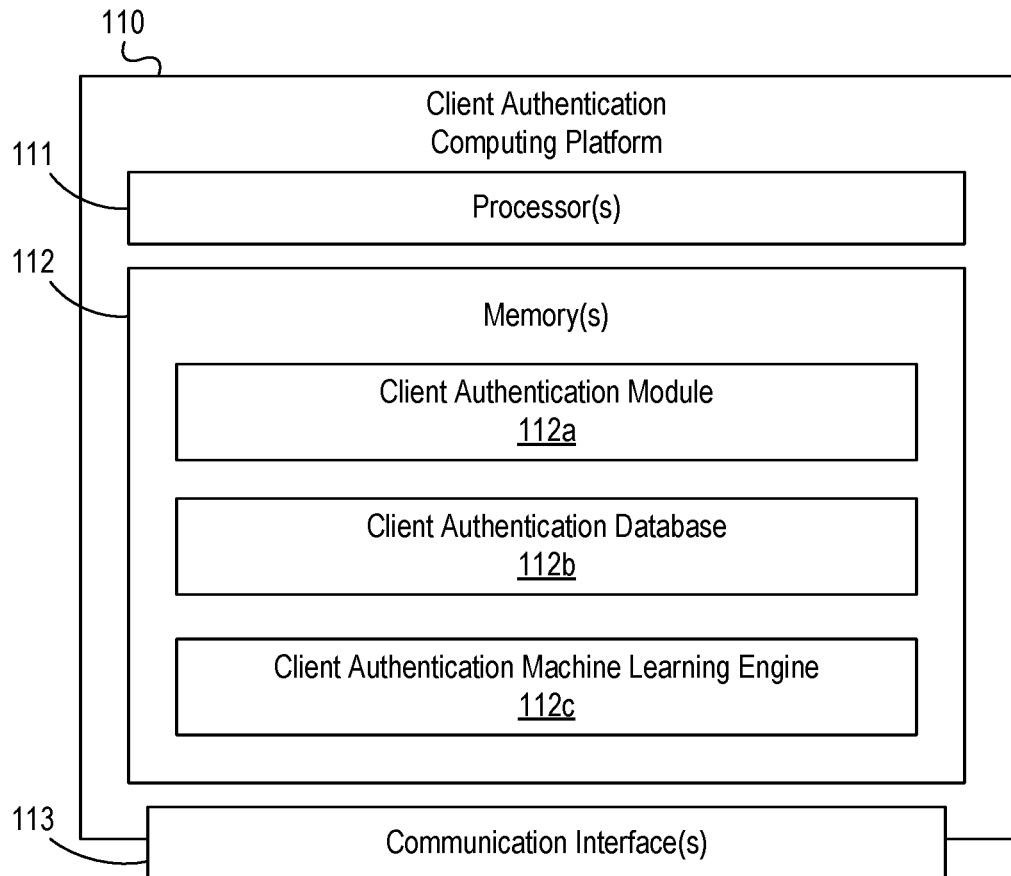

FIGS. 1A and 1B depict an illustrative computing environment for processing authentication requests to secured information systems using machine-learned user-account behavior profiles in accordance with one or more example embodiments. Referring to FIG. 1A, computing environment 100 may include one or more computer systems. For example, computing environment 100 may include a client authentication computing platform 110, an account portal computing platform 120, enterprise server infrastructure 125, a first client computing device 130, a second client computing device 140, a third client computing device 150, and a fourth client computing device 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Account portal computing platform 120 may include one or more computing devices and/or other computer components (e.g., processors, memories, communication interfaces). In addition, and as illustrated in greater detail below, account portal computing platform 120 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by account portal computing platform 120 may be associated with a client portal provided by an organization, such as an online banking portal and/or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Enterprise server infrastructure 125 may include one or more computing devices and/or other computer components (e.g., processors, memories, communication interfaces). In addition, and as illustrated in greater detail below, enterprise server infrastructure 125 may be configured to provide various enterprise and/or back-office computing functions for an organization, such as a financial institution. For example, enterprise server infrastructure 125 may include various servers and/or databases that store and/or otherwise maintain account information, such as financial account information including account balances, transaction history, account owner information, and/or other information. In addition, enterprise server infrastructure 125 may process and/or otherwise execute transactions on specific accounts based on commands and/or other information received from account portal computing platform 120 and/or other computer systems included in computing environment 100.

Client computing device 130 may be a personal computing device (e.g., desktop computer, laptop computer) or mobile computing device (e.g., smartphone, tablet) that may be linked to and/or used by a first user (e.g., of a client portal provided by account portal computing platform 120). Client computing device 140 may be a personal computing device (e.g., desktop computer, laptop computer) or mobile computing device (e.g., smartphone, tablet) that also may be linked to and/or used by the first user (e.g., of a client portal provided by account portal computing platform 120). Client computing device 150 may be a personal computing device (e.g., desktop computer, laptop computer) or mobile computing device (e.g., smartphone, tablet) that may be linked to and/or used by a second user (e.g., of a client portal provided by account portal computing platform 120) different from the first user. Client computing device 160 may be a personal computing device (e.g., desktop computer, laptop computer) or mobile computing device (e.g., smartphone, tablet). In some instances, such as in one or more of the examples described below, client computing device 160 might not be linked to or used by a registered user of a client portal provided by account portal computing platform 120 and instead might be used by a malicious user in an attempt to gain unauthorized access to the client portal provided by account portal computing platform 120.

Computing environment 100 also may include one or more networks, which may interconnect one or more of client authentication computing platform 110, account portal computing platform 120, enterprise server infrastructure 125, client computing device 130, client computing device 140, client computing device 150, and client computing device 160. For example, computing environment 100 may include a private network 170 (which may, e.g., interconnect client authentication computing platform 110, account portal computing platform 120, enterprise server infrastructure 125, and/or one or more other systems which may be associated with an organization, such as a financial institution) and public network 180 (which may, e.g., interconnect client computing device 130, client computing device 140, client computing device 150, and client computing device 160 with private network 170 and/or one or more other systems, public networks, sub-networks, and/or the like).

In one or more arrangements, client computing device 130, client computing device 140, client computing device 150, client computing device 160, and/or the other systems included in computing environment 100 may be any type of computing device capable of receiving a user interface, receiving input via the user interface, and communicating the received input to one or more other computing devices. For example, client computing device 130, client computing device 140, client computing device 150, client computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, account portal computing platform 120, enterprise server infrastructure 125, client computing device 130, client computing device 140, client computing device 150, and client computing device 160 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a, a client authentication database 112b, and a client authentication machine learning engine 112c. Client authentication module 112a may have instructions that direct and/or cause client authentication computing platform 110 to control access to resources of an information system by processing authentication requests based on machine-learned user-account behavior profiles, as discussed in greater detail below. Client authentication database 112b may store information used by client authentication module 112a and/or client authentication computing platform 110 in controlling access to resources of an information system by processing authentication requests based on machine-learned user-account behavior profiles and/or in performing other functions. Client authentication machine learning engine 112c may build and/or refine user-account behavior profiles based on captured and/or logged behavior data, activity data, user interaction data, and/or other data, as illustrated in greater detail below.

Figure 2A:
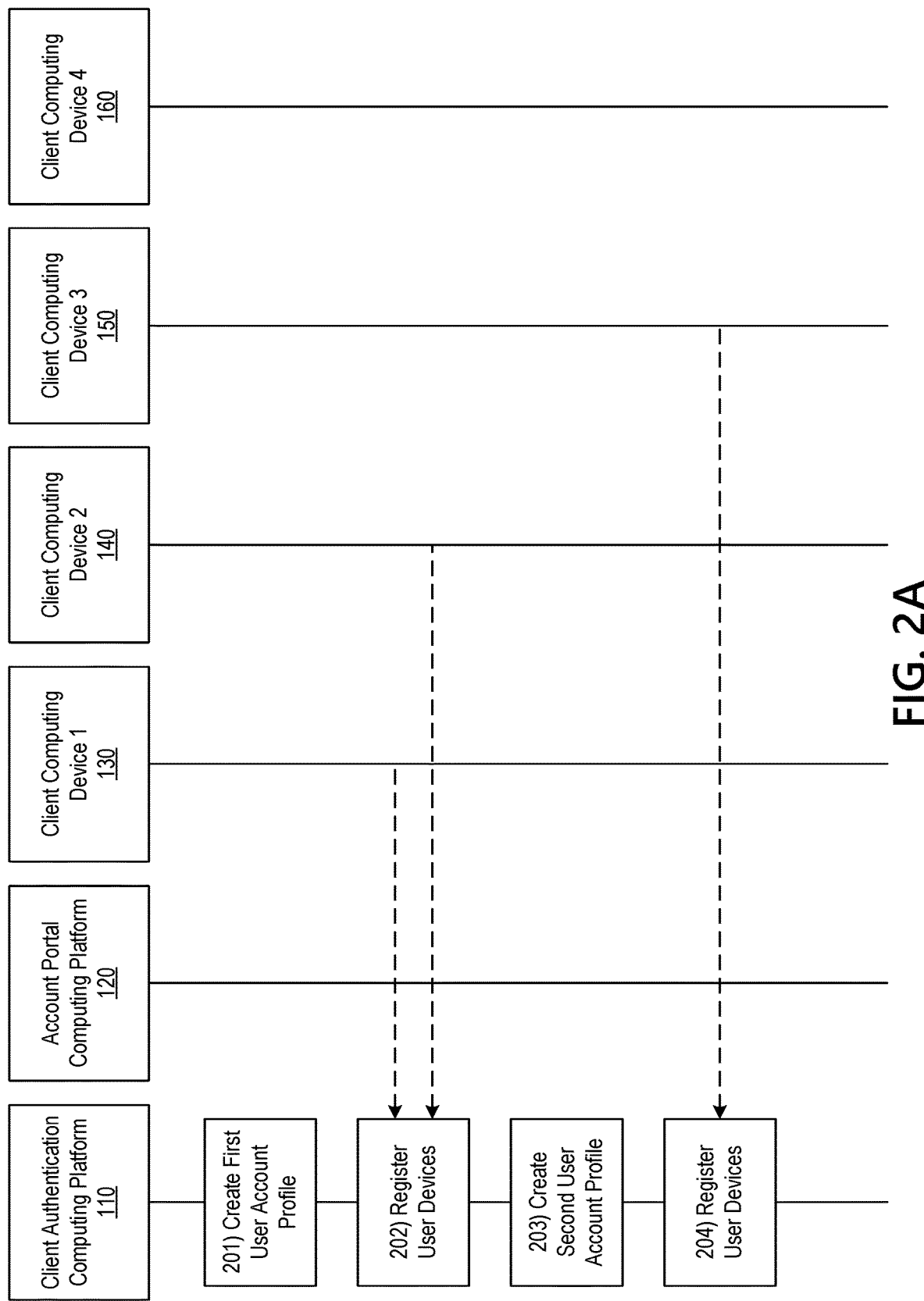

FIGS. 2A-2J depict an illustrative event sequence for processing authentication requests to secured information systems using machine-learned user-account behavior profiles in accordance with one or more example embodiments. Referring to FIG. 2A, at step 201, client authentication computing platform 110 may create a first user account profile (e.g., by creating and/or storing one or more records in client authentication database 112b). For example, at step 201, client authentication computing platform 110 may create a first user account profile corresponding to a first user account. At step 202, client authentication computing platform 110 may register user devices with the first user account. For example, at step 202, client authentication computing platform 110 may register one or more user devices (e.g., client computing device 130, client computing device 140) as being linked to the first user account.

At step 203, client authentication computing platform 110 may create a second user account profile (e.g., by creating and/or storing one or more records in client authentication database 112b). For example, at step 203, client authentication computing platform 110 may create a second user account profile corresponding to a second user account. At step 204, client authentication computing platform 110 may register user devices with the second user account. For example, at step 204, client authentication computing platform 110 may register one or more user devices (e.g., client computing device 150) as being linked to the second user account.

Figure 2B:
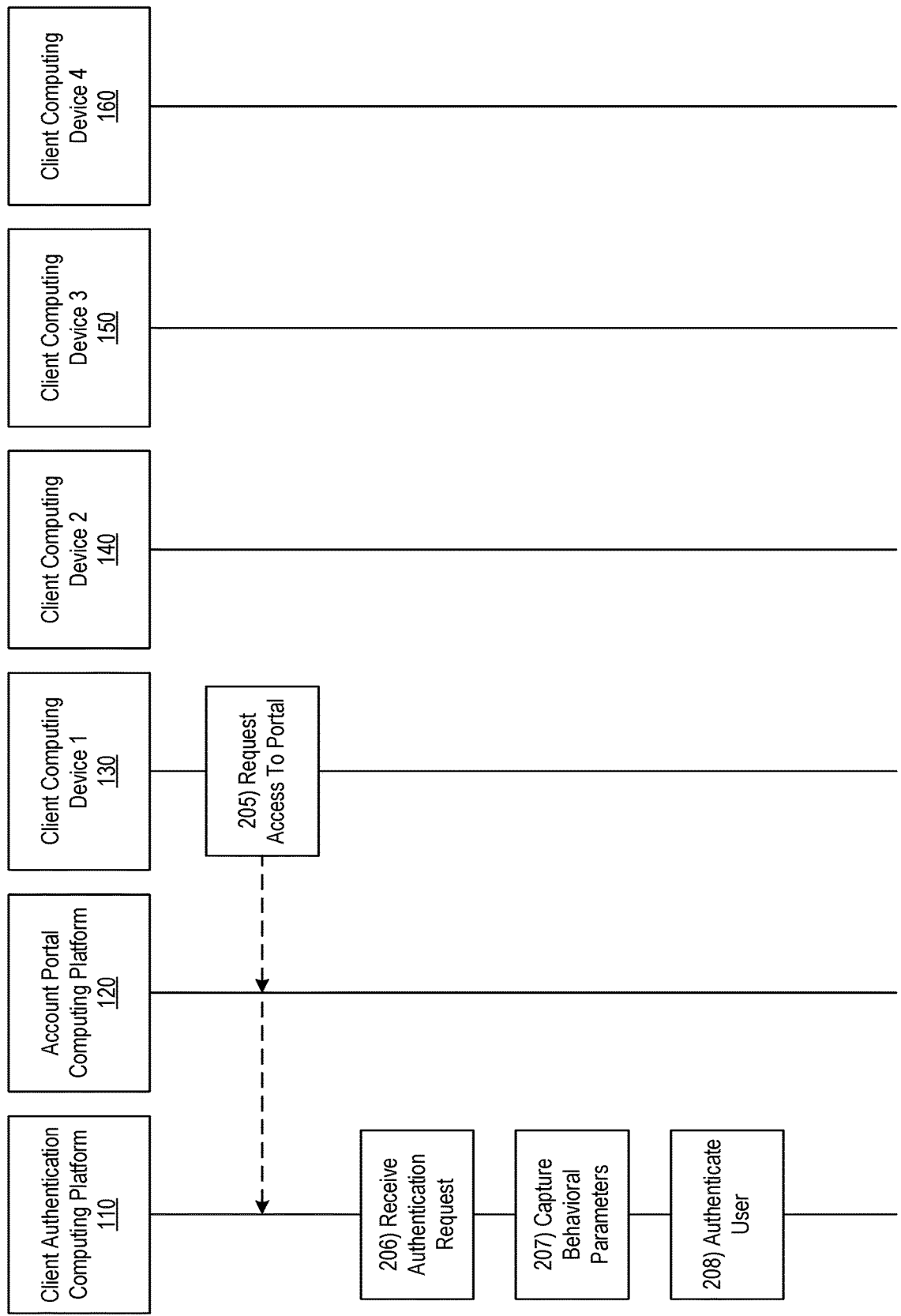

Referring to FIG. 2B, at step 205, client computing device 130 may send a request for portal access to account portal computing platform 120. For example, at step 205, client computing device 130 may request access to a first user account associated with a client account portal provided by account portal computing platform 120. In response to receiving the request, account portal computing platform 120 may generate and/or send an authentication request to client authentication computing platform 110 to authenticate the user of client computing device 130 before providing access to secured information, such as client account information associated with the first user account.

At step 206, client authentication computing platform 110 may receive the authentication request from account portal computing platform 120. For example, at step 206, client authentication computing platform 110 may receive, via the communication interface (e.g., communication interface 113), from an account portal computing platform (e.g., account portal computing platform 120), a first authentication request corresponding to a request for a first user of a first client computing device (e.g., client computing device 130) to access one or more secured information resources associated with a first user account in a first client portal session.

At step 207, client authentication computing platform 110 may capture one or more behavioral parameters associated with the authentication request received from account portal computing platform 120 at step 206. For example, at step 207, based on receiving the first authentication request from the account portal computing platform (e.g., account portal computing platform 120), client authentication computing platform 110 may capture one or more behavioral parameters associated with the first client computing device (e.g., client computing device 130). For instance, client authentication computing platform 110 may log information identifying an order of events associated with the authentication request received from account portal computing platform 120, information identifying a timing of events associated with the authentication request received from account portal computing platform 120, information identifying a communication method associated with the authentication request received from account portal computing platform 120, network information associated with the authentication request received from account portal computing platform 120 (e.g., network address, network details), information about the device (e.g., client computing device 130) associated with the authentication request received from account portal computing platform 120 (e.g., one or more device identifiers, language settings, device location information, and/or other device information), and/or other information. As discussed below, any and/or all of this information may be used by client authentication computing platform 110 in building and/or updating a user-account behavior profile (which may, e.g., be used by client authentication computing platform 110 in evaluating future login events associated with the first user account).

In some embodiments, capturing the one or more behavioral parameters associated with the first client computing device may include capturing one or more of a device identifier associated with the first client computing device, device settings information associated with the first client computing device, device location information associated with the first client computing device, or at least one network address associated with the first client computing device. For example, in capturing the one or more behavioral parameters associated with the first client computing device (e.g., client computing device 130) at step 207, client authentication computing platform 110 may capture one or more of a device identifier associated with the first client computing device (e.g., client computing device 130), device settings information associated with the first client computing device (e.g., client computing device 130), device location information associated with the first client computing device (e.g., client computing device 130), or at least one network address associated with the first client computing device (e.g., client computing device 130). Client authentication computing platform 110 may capture any and/or all of this information by parsing data associated with the authentication request received from account portal computing platform 120 and/or by interrogating and/or otherwise directly communicating with client computing device 130.

In some embodiments, capturing the one or more behavioral parameters associated with the first client computing device may include capturing second activity data associated with one or more interactions by the first client computing device with one or more non-authenticated pages hosted by the account portal computing platform. For example, in capturing the one or more behavioral parameters associated with the first client computing device (e.g., client computing device 130) at step 207, client authentication computing platform 110 may capture second activity data associated with one or more interactions by the first client computing device (e.g., client computing device 130) with one or more non-authenticated pages hosted by the account portal computing platform (e.g., account portal computing platform 120). For instance, client authentication computing platform 110 may capture second activity data associated with one or more interactions by the first client computing device (e.g., client computing device 130) with one or more welcome pages hosted by the account portal computing platform (e.g., account portal computing platform 120), one or more help pages hosted by the account portal computing platform (e.g., account portal computing platform 120), one or more marketing pages hosted by the account portal computing platform (e.g., account portal computing platform 120), one or more informational pages hosted by the account portal computing platform (e.g., account portal computing platform 120), and/or one or more other non-authenticated pages hosted by the account portal computing platform (e.g., account portal computing platform 120).

At step 208, client authentication computing platform 110 may authenticate the user of client computing device 130. For example, at step 208, client authentication computing platform 110 may authenticate the first user of the first client computing device (e.g., client computing device 130) to the first user account based on the one or more behavioral parameters associated with the first client computing device (e.g., client computing device 130) and one or more authentication credentials associated with the first authentication request. For instance, client authentication computing platform 110 may evaluate and validate one or more authentication credentials received from account portal computing platform 120 and/or client computing device 130, as well as compare and validate the captured behavioral parameters and current activity data against the user-account behavioral profile corresponding to the user account.

In some embodiments, authenticating the first user of the first client computing device to the first user account may include validating one or more authentication credentials associated with the first authentication request. For example, in authenticating the first user of the first client computing device (e.g., client computing device 130) to the first user account at step 208, client authentication computing platform 110 may validate one or more authentication credentials associated with the first authentication request. For instance, client authentication computing platform 110 may evaluate one or more credentials (e.g., username(s), password(s), one-time passcode(s), security question(s), biometrics(s)) and may determine that such credentials are valid.

In some embodiments, authenticating the first user of the first client computing device to the first user account may include: evaluating the one or more behavioral parameters associated with the first client computing device; and determining that the one or more behavioral parameters associated with the first client computing device are valid based on evaluating the one or more behavioral parameters associated with the first client computing device. For example, in authenticating the first user of the first client computing device (e.g., client computing device 130) to the first user account, client authentication computing platform 110 may evaluate the one or more behavioral parameters associated with the first client computing device (e.g., client computing device 130). In addition, client authentication computing platform 110 may determine that the one or more behavioral parameters associated with the first client computing device (e.g., client computing device 130) are valid based on evaluating the one or more behavioral parameters associated with the first client computing device (e.g., client computing device 130). For instance, client authentication computing platform 110 may determine that the one or more behavioral parameters are valid based on the sum of the distances between the captured parameters and corresponding features of the behavioral profile not exceeding a predetermined threshold.

Referring to FIG. 2C, at step 209, client authentication computing platform 110 may generate one or more authentication commands. For example, at step 209, based on authenticating the first user of the first client computing device (e.g., client computing device 130) to the first user account, client authentication computing platform 110 may generate one or more authentication commands directing the account portal computing platform (e.g., account portal computing platform 120) to allow access to the one or more secured information resources associated with the first user account in the first client portal session. At step 210, client authentication computing platform 110 may send the one or more authentication commands to account portal computing platform 120. For example, at step 210, client authentication computing platform 110 may send, via the communication interface (e.g., communication interface 113), to the account portal computing platform (e.g., account portal computing platform 120), the one or more authentication commands directing the account portal computing platform (e.g., account portal computing platform 120) to allow access to the one or more secured information resources associated with the first user account in the first client portal session.

At step 211, account portal computing platform 120 may generate one or more portal user interfaces based on the one or more authentication commands received from client authentication computing platform 110. At step 212, account portal computing platform 120 may send the one or more portal user interfaces to client computing device 130 (which may, e.g., trigger and/or otherwise cause client computing device 130 to display and/or otherwise present the one or more portal user interfaces).

Figure 2D:
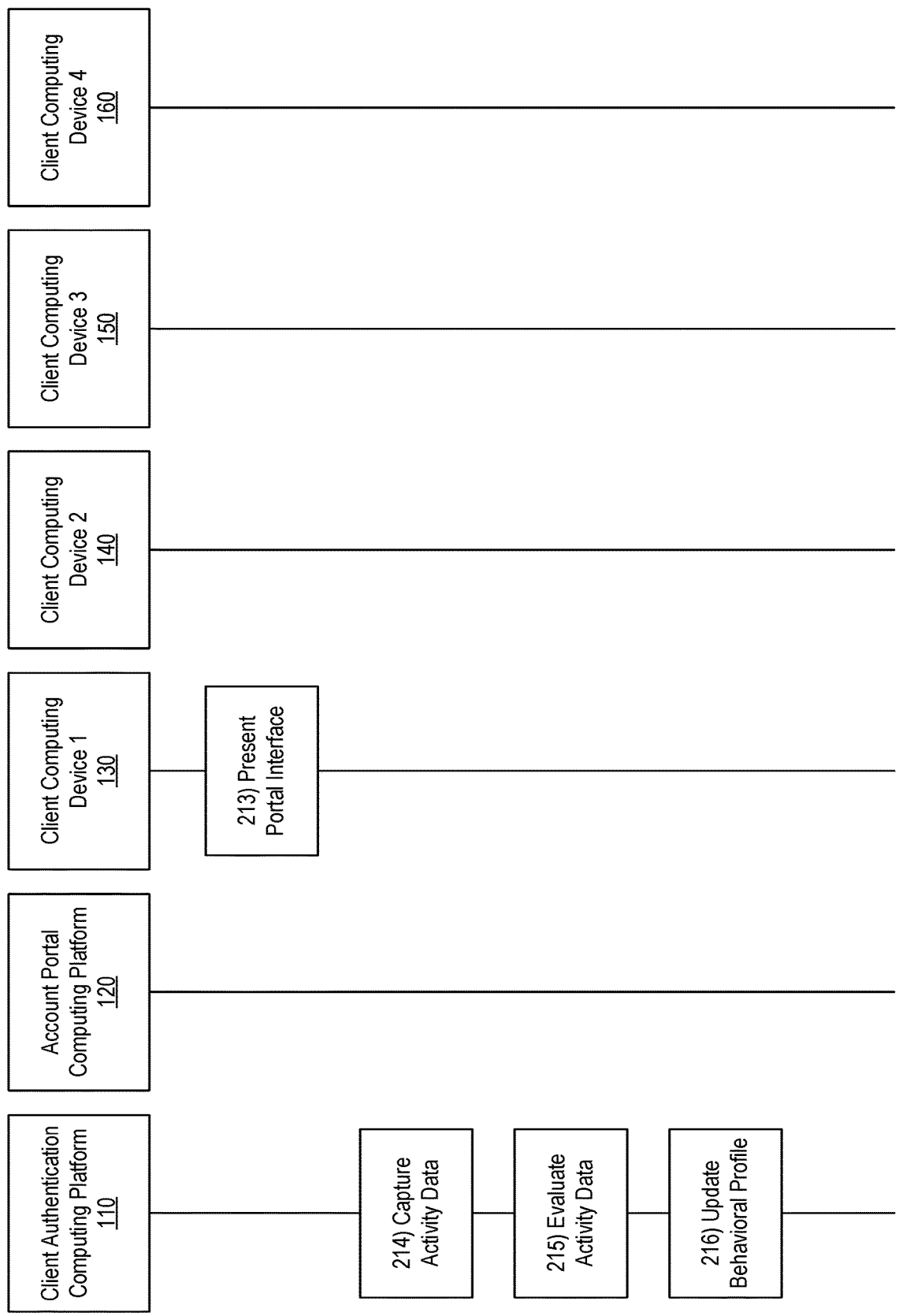

Referring to FIG. 2D, at step 213, client computing device 130 may present the one or more portal user interfaces received from account portal computing platform 120. For example, in presenting the one or more portal user interfaces received from account portal computing platform 120, client computing device 130 may display and/or otherwise present one or more graphical user interfaces that include and/or correspond to the one or more portal user interfaces received from account portal computing platform 120.

At step 214, client authentication computing platform 110 may capture activity data (which may, e.g., include information identifying various specific parameters of usage of the portal). For example, at step 214, after sending the one or more authentication commands directing the account portal computing platform (e.g., account portal computing platform 120) to allow access to the one or more secured information resources associated with the first user account in the first client portal session, client authentication computing platform 110 may capture first activity data associated with one or more interactions in the first client portal session. For instance, client authentication computing platform 110 may capture activity data identifying specific pages, menus, and/or resources accessed by the user of client computing device 130 via the portal, activity data identifying amounts of time that specific pages, menus, and/or resources were accessed by the user of client computing device 130 via the portal, activity data identifying an order in which specific pages, menus, and/or resources were accessed by the user of client computing device 130 via the portal, and/or other activity data. Client authentication computing platform 110 may capture such activity data from account portal computing platform 120 (e.g., by communicating with account portal computing platform 120) and/or from client computing device 130 (e.g., by directly interrogating and/or otherwise communicating with client computing device 130).

In some embodiments, capturing the first activity data associated with the one or more interactions in the first client portal session may include receiving information identifying one or more requests received from the first client computing device in the first client portal session, information identifying an order of the one or more requests received from the first client computing device in the first client portal session, and information identifying a timing of the one or more requests received from the first client computing device in the first client portal session. For example, in capturing the first activity data associated with the one or more interactions in the first client portal session (e.g., at step 214), client authentication computing platform 110 may receive information identifying one or more requests received from the first client computing device (e.g., client computing device 130) in the first client portal session, information identifying an order of the one or more requests received from the first client computing device (e.g., client computing device 130) in the first client portal session, and information identifying a timing of the one or more requests received from the first client computing device (e.g., client computing device 130) in the first client portal session. Client authentication computing platform 110 may capture such activity data from account portal computing platform 120 (e.g., by communicating with account portal computing platform 120) and/or from client computing device 130 (e.g., by directly interrogating and/or otherwise communicating with client computing device 130).

At step 215, client authentication computing platform 110 may evaluate the captured activity data (e.g., based on a behavioral profile that includes data points across multiple dimensions, as discussed below). For example, at step 215, client authentication computing platform 110 may evaluate the information identifying the one or more requests received from the first client computing device (e.g., client computing device 130) in the first client portal session, the information identifying the order of the one or more requests received from the first client computing device (e.g., client computing device 130) in the first client portal session, and the information identifying the timing of the one or more requests received from the first client computing device (e.g., client computing device 130) in the first client portal session based on the first behavioral profile associated with the first user account. For instance, client authentication computing platform 110 may evaluate any and/or all of this information based on a first behavioral profile associated with the first user account (which may, e.g., include account-specific historical information and/or other information across multiple dimensions, as discussed below, such as a channels information, events information, triggers information, biometric information, and/or other information). In some instances, in monitoring and evaluating the captured activity data, client authentication computing platform 110 also may initiate and/or execute one or more triggered events based on the behavioral profile associated with the user account. In addition, based on evaluating the information identifying the one or more requests received from the first client computing device (e.g., client computing device 130) in the first client portal session, the information identifying the order of the one or more requests received from the first client computing device (e.g., client computing device 130) in the first client portal session, and the information identifying the timing of the one or more requests received from the first client computing device (e.g., client computing device 130) in the first client portal session, client authentication computing platform 110 may continue to allow access to the one or more secured information resources associated with the first user account in the first client portal session. For instance, based on evaluating the captured activity data and determining that the captured activity data aligns with the behavioral profile, client authentication computing platform 110 may continue to allow access to the user account. If client authentication computing platform 110 determines that the captured activity data departs from the behavioral profile, client authentication computing platform 110 alternatively may deny and/or halt access to the user account.

At step 216, client authentication computing platform 110 may update a behavioral profile for the first user account (e.g., based on the captured activity data). For example, at step 216, client authentication computing platform 110 may update a first behavioral profile associated with the first user account based on the first activity data associated with the one or more interactions in the first client portal session. For instance, in updating the first behavioral profile associated with the first user account based on the first activity data associated with the one or more interactions in the first client portal session, client authentication computing platform 110 may create the first behavioral profile (e.g., if a behavioral profile does not already exist for the first user account) or may update an existing behavioral profile for the first user account. As discussed below, client authentication computing platform 110 may update the first behavioral profile to include the captured activity data and/or information determined by client authentication computing platform 110 based on the captured activity data. In addition, in some instances, the first behavioral profile may be viewable by an administrative user of an administrative computing device that accesses and/or is otherwise associated with client authentication computing platform 110. For example, client authentication computing platform 110 may generate and/or provide an administrative portal to an administrative user of an administrative computing device, which may cause the administrative computing device to display one or more graphical user interfaces similar to graphical user interface 300, which is illustrated in FIG. 3. As seen in FIG. 3, graphical user interface 300 may include graphical content and/or other information associated with different dimensions of a behavioral profile associated with a particular user account, such as a channels dimension, an events dimension, a triggers dimension, a biometrics dimension, and an external dimension associated with the first behavioral profile associated with the first user account.

In some embodiments, the first behavioral profile associated with the first user account may include channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile. For example, the first behavioral profile associated with the first user account (which mat, e.g., by updated by client authentication computing platform 110 at step 216) may include channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile.

In addition, in some embodiments, updating the first behavioral profile associated with the first user account based on the first activity data associated with the one or more interactions in the first client portal session may include updating the channel information associated with the channels dimension of the first behavioral profile, the event information associated with the events dimension of the first behavioral profile, the trigger information associated with the triggers dimension of the first behavioral profile, the biometric information associated with the biometrics dimension of the first behavioral profile, and the external information associated with the external dimension of the first behavioral profile. For example, in updating the first behavioral profile associated with the first user account based on the first activity data associated with the one or more interactions in the first client portal session at step 216, client authentication computing platform 110 may update the channel information associated with the channels dimension of the first behavioral profile, the event information associated with the events dimension of the first behavioral profile, the trigger information associated with the triggers dimension of the first behavioral profile, the biometric information associated with the biometrics dimension of the first behavioral profile, and the external information associated with the external dimension of the first behavioral profile.

In some embodiments, the channel information associated with the channels dimension of the first behavioral profile may include first channel activity information identifying actions involving the first user account across one or more internal channels and second channel activity information identifying actions involving the first user account across one or more external channels. For example, profile data that is included in and/or otherwise associated with the channels dimension of a behavioral profile may capture a user's activity across various internal channels (which may, e.g., be provided by an organization operating account portal computing platform 120, such as a financial institution) and/or external channels (which may, e.g., be provided by a different organization than the organization operating account portal computing platform 120). For instance, the internal channels may include an online banking channel, mobile banking channel, interactive voice response (IVR) channel, a contact center channel, a financial center channel, and/or other channels. The external channels may, for instance, capture interactions with other banks and/or organizations, based on data received via data sharing services and/or relationships.

In some embodiments, the event information associated with the events dimension of the first behavioral profile may identify at least one user-specific event that is automatically executable based on at least one trigger. For example, the event information associated with the events dimension of the first behavioral profile updated by client authentication computing platform 110 at step 216 may identify an automatically executable event such as a lock account event (which may, e.g., prevent access to the account until the account owner visits a banking center in person), a freeze transactions event (which may, e.g., prevent further transactions on the account from being approved until the account holder unfreezes the account in online banking or via an IVR system), and/or a reset password event (which may, e.g., reset the account password). In addition, the event information associated with the events dimension of the first behavioral profile updated by client authentication computing platform 110 at step 216 may identify one or more triggers for such events, such as a number of failed login attempts, unusual account activity, unusual portal usage activity, and/or other triggers.

In some embodiments, the trigger information associated with the triggers dimension of the first behavioral profile may identify at least one user-specific condition set that invokes automatic execution of at least one user-specific event. For example, the trigger information associated with the triggers dimension of the first behavioral profile updated by client authentication computing platform 110 at step 216 may identify one or more user-specific thresholds and/or other conditions that may trigger particular events, such as execution of a first event after five failed login attempts, execution of a second event after ten failed login attempts, execution of a third event after fifteen failed login events, or the like.

In some embodiments, the biometric information associated with the biometrics dimension of the first behavioral profile may include biometric activity information identifying biometric login actions involving the first user account. For example, the biometric information associated with the biometrics dimension of the first behavioral profile updated by client authentication computing platform 110 at step 216 may include biometric activity information identifying biometric login actions involving the first user account. Such biometric activity information may, for instance, capture user-specific biometrics (which may, e.g., include validation data associated with a particular user's authentication biometrics, a particular user's history or frequency of using particular biometrics to authenticate, and/or the like).

In some embodiments, the external information associated with the external dimension of the first behavioral profile may include one or more of user-specific social data or user-specific digital health data. For example, the external information associated with the external dimension of the first behavioral profile updated by client authentication computing platform 110 at step 216 may include user-specific social data, user-specific digital health data, and/or other customer-specific data that may be evaluated for authentication purposes. For instance, the user-specific social data may include social networking handles, social feed content, personal assets identified in social feeds, social preferences such as likes and dislikes, social posting behavior, social shopping behavior, and/or the like. The user-specific digital health data may, for instance, include data captured by a customer's linked wearable device. In addition, other customer-specific data that may be evaluated for authentication purposes may, for instance, include non-customer identifiers, such as phone numbers and/or other identifiers associated with non-registered customers who utilize bank services, such as cash checking.

After processing the first authentication event involving the first user account (e.g., as described above in connection with the examples above), client authentication computing platform 110 may process a second authentication event involving the first user account, and may update the user account's behavioral profile accordingly. Referring to FIG. 2E, at step 217, client computing device 140 may request access to the first user account associated with the client account portal provided by account portal computing platform 120. In response to receiving the request, account portal computing platform 120 may generate and/or send an authentication request to client authentication computing platform 110 to authenticate the user of client computing device 140 before providing access to secured information, such as client account information associated with the first user account.

At step 218, client authentication computing platform 110 may receive the authentication request from account portal computing platform 120. For example, at step 218, client authentication computing platform 110 may receive, via the communication interface (e.g., communication interface 113), from the account portal computing platform (e.g., account portal computing platform 120), a second authentication request corresponding to a request for a second user of a second client computing device (e.g., client computing device 140) to access one or more secured information resources associated with the first user account in a second client portal session.

At step 219, client authentication computing platform 110 may capture one or more behavioral parameters associated with the authentication request received from account portal computing platform 120 at step 218. For example, at step 219, based on receiving the second authentication request from the account portal computing platform (e.g., account portal computing platform 120), client authentication computing platform 110 may capture one or more behavioral parameters associated with the second client computing device (e.g., client computing device 140). For instance, client authentication computing platform 110 may log information identifying an order of events associated with the authentication request received from account portal computing platform 120, information identifying a timing of events associated with the authentication request received from account portal computing platform 120, information identifying a communication method associated with the authentication request received from account portal computing platform 120, network information associated with the authentication request received from account portal computing platform 120 (e.g., network address, network details), information about the device (e.g., client computing device 140) associated with the authentication request received from account portal computing platform 120 (e.g., one or more device identifiers, language settings, device location information, and/or other device information), and/or other information.

At step 220, client authentication computing platform 110 may authenticate the user of client computing device 140. For example, at step 220, client authentication computing platform 110 may authenticate the second user of the second client computing device (e.g., client computing device 140) to the first user account based on the one or more behavioral parameters associated with the second client computing device (e.g., client computing device 140) and one or more authentication credentials associated with the second authentication request. For instance, client authentication computing platform 110 may evaluate and validate one or more authentication credentials received from account portal computing platform 120 and/or client computing device 140, as well as compare and validate the captured behavioral parameters and current activity data against the user-account behavioral profile corresponding to the user account.

Figure 2F:
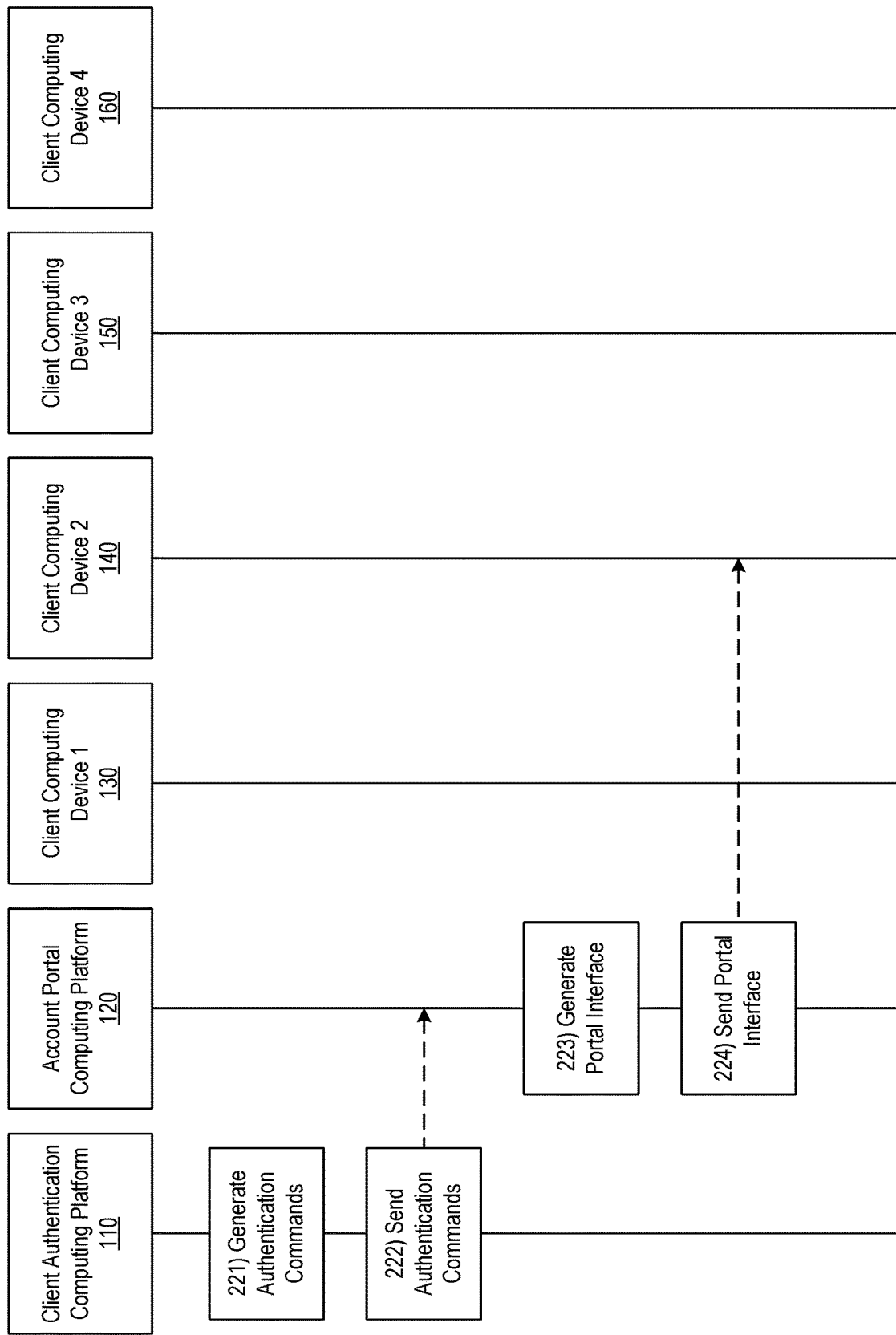

Referring to FIG. 2F, at step 221, client authentication computing platform 110 may generate one or more authentication commands. For example, at step 221, based on authenticating the second user of the second client computing device (e.g., client computing device 140) to the first user account, client authentication computing platform 110 may generate one or more authentication commands directing the account portal computing platform (e.g., account portal computing platform 120) to allow access to the one or more secured information resources associated with the first user account in the second client portal session. At step 222, client authentication computing platform 110 may send the one or more authentication commands to account portal computing platform 120. For example, at step 222, client authentication computing platform 110 may send, via the communication interface (e.g., communication interface 113), to the account portal computing platform (e.g., account portal computing platform 120), the one or more authentication commands directing the account portal computing platform (e.g., account portal computing platform 120) to allow access to the one or more secured information resources associated with the first user account in the second client portal session.

At step 223, account portal computing platform 120 may generate one or more portal user interfaces based on the one or more authentication commands received from client authentication computing platform 110. At step 224, account portal computing platform 120 may send the one or more portal user interfaces to client computing device 140 (which may, e.g., trigger and/or otherwise cause client computing device 140 to display and/or otherwise present the one or more portal user interfaces).

Figure 2G:
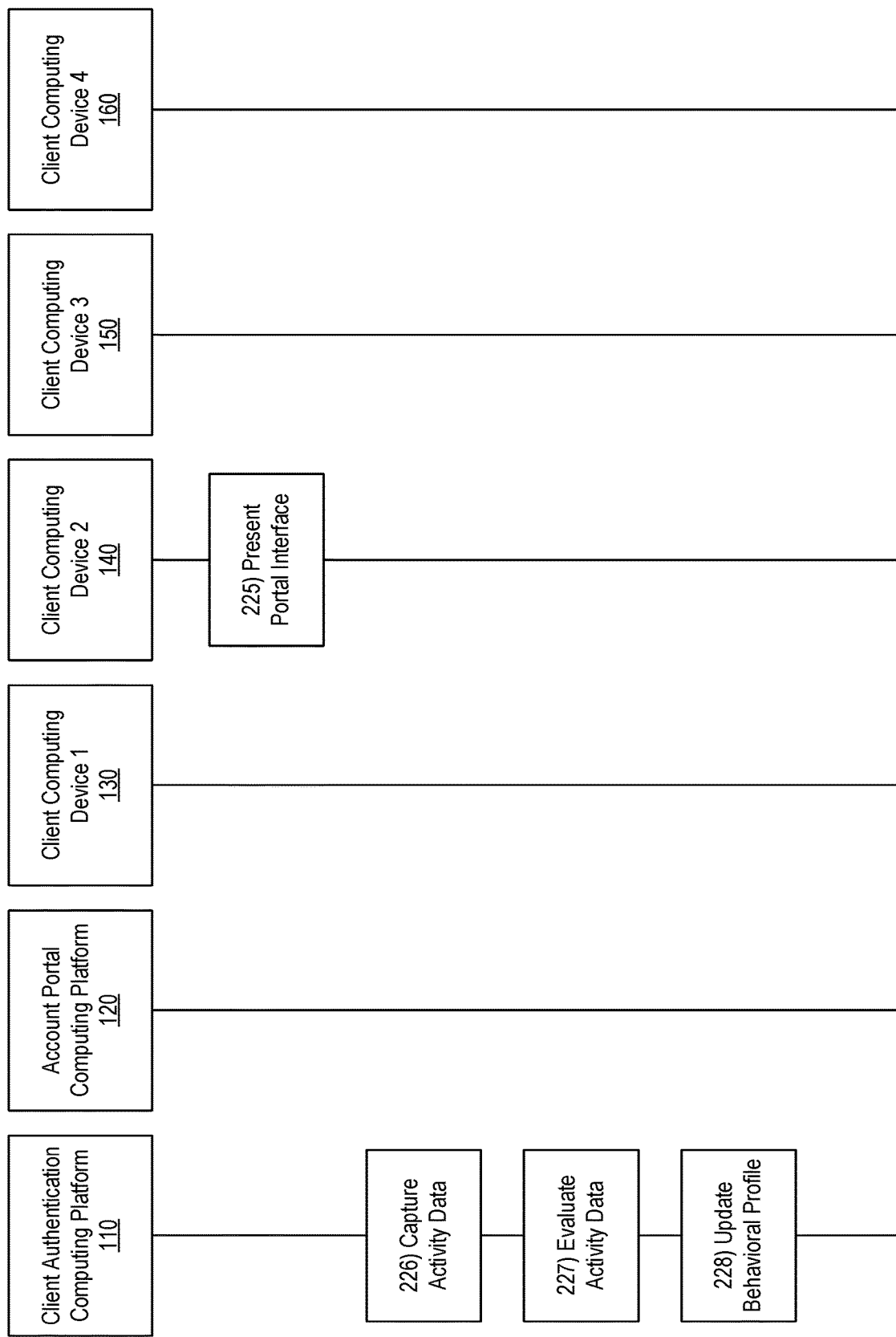

Referring to FIG. 2G, at step 225, client computing device 140 may present the one or more portal user interfaces received from account portal computing platform 120. For example, in presenting the one or more portal user interfaces received from account portal computing platform 120, client computing device 140 may display and/or otherwise present one or more graphical user interfaces similar to graphical user interface 400, which is illustrated in FIG. 4. As seen in FIG. 4, graphical user interface 400 may include and/or correspond to the one or more portal user interfaces received from account portal computing platform 120. For instance, graphical user interface 400 may include an online banking menu that has one or more user-selectable options corresponding to different online banking functions (e.g., "View Account Information; Create/Manage Funds Transfer; Access Online Bill Pay Menu; Help; More Options").

At step 226, client authentication computing platform 110 may capture activity data (which may, e.g., include information identifying various specific parameters of usage of the portal). For example, at step 226, after sending the one or more authentication commands directing the account portal computing platform (e.g., account portal computing platform 120) to allow access to the one or more secured information resources associated with the first user account in the second client portal session, client authentication computing platform 110 may capture second activity data associated with one or more interactions in the second client portal session. For instance, client authentication computing platform 110 may capture activity data identifying specific pages, menus, and/or resources accessed by the user of client computing device 140 via the portal, activity data identifying amounts of time that specific pages, menus, and/or resources were accessed by the user of client computing device 140 via the portal, activity data identifying an order in which specific pages, menus, and/or resources were accessed by the user of client computing device 140 via the portal, and/or other activity data. Client authentication computing platform 110 may capture such activity data from account portal computing platform 120 (e.g., by communicating with account portal computing platform 120) and/or from client computing device 140 (e.g., by directly interrogating and/or otherwise communicating with client computing device 140).

At step 227, client authentication computing platform 110 may evaluate the captured activity data (e.g., based on the behavioral profile associated with the user account and the behavioral profile's associated data points across multiple dimensions). For example, at step 227, client authentication computing platform 110 may evaluate the information identifying the one or more requests received from the second client computing device (e.g., client computing device 140) in the second client portal session, the information identifying the order of the one or more requests received from the second client computing device (e.g., client computing device 140) in the second client portal session, and the information identifying the timing of the one or more requests received from the second client computing device (e.g., client computing device 140) in the second client portal session based on the first behavioral profile associated with the first user account. In addition, client authentication computing platform 110 may monitor and/or evaluate the captured activity data and/or may initiate and/or execute one or more triggered events, as in the previous steps described above.

At step 228, client authentication computing platform 110 may update the behavioral profile for the first user account (e.g., based on the captured activity data). For example, at step 228, client authentication computing platform 110 may update the first behavioral profile associated with the first user account based on the second activity data associated with the one or more interactions in the second client portal session. For instance, client authentication computing platform 110 may update the behavioral profile based on the captured activity data similar to how client authentication computing platform 110 may update the behavioral profile in the previous steps described above.

After processing the second authentication event involving the first user account (e.g., as described above in connection with the examples above), client authentication computing platform 110 may process a third authentication event involving the first user account, and may flag the third authentication event as an attempt to gain unauthorized access to the first user account based on a known malicious user profile that tracks data across the same dimensions as the customer behavioral profiles described above. Referring to FIG. 2H, at step 229, client computing device 160 may request access to the first user account associated with the client account portal provided by account portal computing platform 120. In response to receiving the request, account portal computing platform 120 may generate and/or send an authentication request to client authentication computing platform 110 to authenticate the user of client computing device 160 before providing access to secured information, such as client account information associated with the first user account.

At step 230, client authentication computing platform 110 may receive the authentication request from account portal computing platform 120. For example, at step 230, client authentication computing platform 110 may receive, via the communication interface (e.g., communication interface 113), from an account portal computing platform (e.g., account portal computing platform 120), a first authentication request corresponding to a request for a first user of a first client computing device (e.g., client computing device 160) to access one or more secured information resources associated with a first user account in a first client portal session.

At step 231, client authentication computing platform 110 may capture one or more behavioral parameters associated with the authentication request received from account portal computing platform 120 at step 230. For example, at step 231, based on receiving the first authentication request from the account portal computing platform (e.g., account portal computing platform 120), client authentication computing platform 110 may capture one or more behavioral parameters associated with the first client computing device (e.g., client computing device 160). For instance, client authentication computing platform 110 may log information identifying an order of events associated with the authentication request received from account portal computing platform 120, information identifying a timing of events associated with the authentication request received from account portal computing platform 120, information identifying a communication method associated with the authentication request received from account portal computing platform 120, network information associated with the authentication request received from account portal computing platform 120 (e.g., network address, network details), information about the device (e.g., client computing device 160) associated with the authentication request received from account portal computing platform 120 (e.g., one or more device identifiers, language settings, device location information, and/or other device information), and/or other information.

In some embodiments, capturing the one or more behavioral parameters associated with the first client computing device may include capturing one or more of a device identifier associated with the first client computing device, device settings information associated with the first client computing device, device location information associated with the first client computing device, or at least one network address associated with the first client computing device. For example, in capturing the one or more behavioral parameters associated with the first client computing device (e.g., client computing device 160) at step 231, client authentication computing platform 110 may capture one or more of a device identifier associated with the first client computing device (e.g., client computing device 160), device settings information associated with the first client computing device (e.g., client computing device 160), device location information associated with the first client computing device (e.g., client computing device 160), or at least one network address associated with the first client computing device (e.g., client computing device 160). Client authentication computing platform 110 may capture any and/or all of this information by parsing data associated with the authentication request received from account portal computing platform 120 and/or by interrogating and/or otherwise directly communicating with client computing device 160.

At step 232, client authentication computing platform 110 may capture activity data associated with client computing device 160. For example, at step 232, client authentication computing platform 110 may capture first activity data associated with one or more interactions by the first client computing device (e.g., client computing device 160) with one or more non-authenticated pages hosted by the account portal computing platform (e.g., account portal computing platform 120), such as data that identifies and/or describes interactions with a login page and/or other pages provided by account portal computing platform 120 before a user is authenticated. For instance, client authentication computing platform 110 may capture first activity data associated with one or more interactions by the first client computing device (e.g., client computing device 160) with one or more welcome pages hosted by the account portal computing platform (e.g., account portal computing platform 120), one or more help pages hosted by the account portal computing platform (e.g., account portal computing platform 120), one or more marketing pages hosted by the account portal computing platform (e.g., account portal computing platform 120), one or more informational pages hosted by the account portal computing platform (e.g., account portal computing platform 120), and/or one or more other non-authenticated pages hosted by the account portal computing platform (e.g., account portal computing platform 120). Additionally or alternatively, client authentication computing platform 110 may capture activity data identifying specific pages, menus, and/or resources accessed by the user of client computing device 160, activity data identifying amounts of time that specific pages, menus, and/or resources were accessed by the user of client computing device 160, activity data identifying an order in which specific pages, menus, and/or resources were accessed by the user of client computing device 160, and/or other activity data. Client authentication computing platform 110 may capture such activity data from account portal computing platform 120 (e.g., by communicating with account portal computing platform 120) and/or from client computing device 160 (e.g., by directly interrogating and/or otherwise communicating with client computing device 160).

In some embodiments, capturing the first activity data associated with the one or more interactions by the first client computing device with the one or more non-authenticated pages hosted by the account portal computing platform may include receiving information identifying one or more requests received from the first client computing device, information identifying an order of the one or more requests received from the first client computing device, and information identifying a timing of the one or more requests received from the first client computing device. For example, in capturing the first activity data associated with the one or more interactions by the first client computing device (e.g., client computing device 160) with the one or more non-authenticated pages hosted by the account portal computing platform (e.g., account portal computing platform 120), client authentication computing platform 110 may receive information identifying one or more requests received from the first client computing device (e.g., client computing device 160), information identifying an order of the one or more requests received from the first client computing device (e.g., client computing device 160), and information identifying a timing of the one or more requests received from the first client computing device (e.g., client computing device 160). Client authentication computing platform 110 may capture such activity data from account portal computing platform 120 (e.g., by communicating with account portal computing platform 120) and/or from client computing device 160 (e.g., by directly interrogating and/or otherwise communicating with client computing device 160).

Figure 2I:
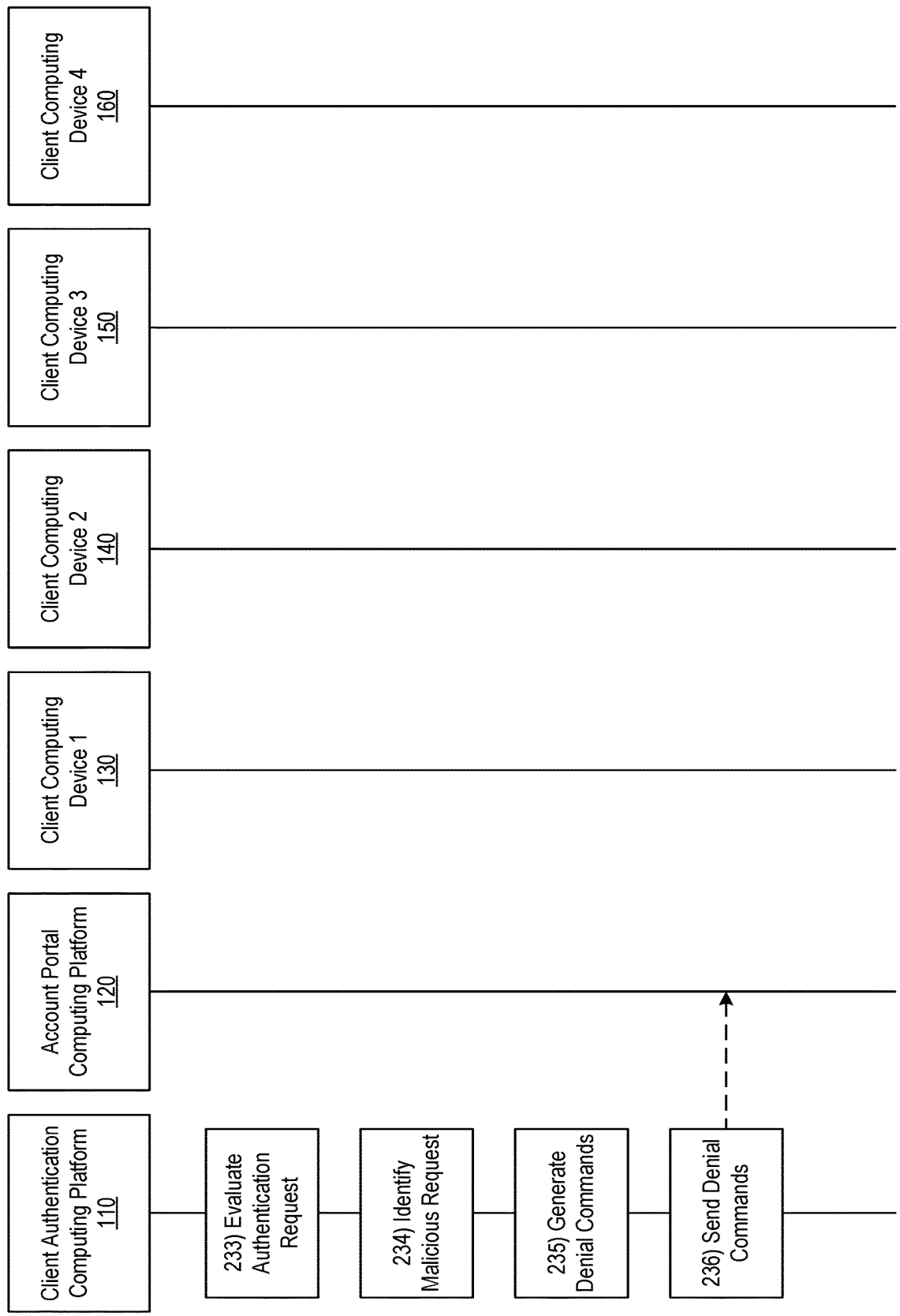

Referring to FIG. 2I, at step 233, client authentication computing platform 110 may evaluate the authentication request (e.g., based on received authentication credentials, captured behavioral parameters, and/or captured activity data). For example, at step 233, client authentication computing platform 110 may evaluate the one or more behavioral parameters associated with the first client computing device (e.g., client computing device 160) and the first activity data based on a first behavioral profile associated with the first user account. For instance, client authentication computing platform 110 may evaluate the one or more behavioral parameters associated with the first client computing device (e.g., client computing device 160) and the first activity data based on the first behavioral profile discussed above (which may, e.g., include information across a channels dimension, events dimension, triggers dimension, biometric dimension, and/or other dimension for the first user account).

In some embodiments, evaluating the authentication request may include calculating one or more distance values, comparing the calculated distance values to one or more thresholds, and classifying the authentication request based on the comparing. For example, in evaluating the one or more behavioral parameters associated with the first client computing device (e.g., client computing device 160) and the first activity data based on the first behavioral profile associated with the first user account, client authentication computing platform 110 may calculate one or more first distance values between the one or more behavioral parameters associated with the first client computing device (e.g., client computing device 160) and corresponding parameters of the first behavioral profile (which may, e.g., correspond to the channels dimension, events dimension, triggers dimension, biometric dimension, and/or other dimension for the first behavioral profile for the first user account). In addition, client authentication computing platform 110 may calculate one or more second distance values between one or more activity parameters associated with the first activity data and corresponding parameters of the first behavioral profile (which may, e.g., correspond to the channels dimension, events dimension, triggers dimension, biometric dimension, and/or other dimension for the first behavioral profile for the first user account). Subsequently, client authentication computing platform 110 may compare the one or more first distance values to at least one predefined behavioral difference threshold. In addition, client authentication computing platform 110 may compare the one or more second distance values to at least one predefined activity difference threshold. Subsequently, client authentication computing platform 110 may determine that the one or more first distance values exceed the at least one predefined behavioral difference threshold or that the one or more second distance values exceed the at least one predefined activity difference threshold. Responsive to determining that the one or more first distance values exceed the at least one predefined behavioral difference threshold or that the one or more second distance values exceed the at least one predefined activity difference threshold, client authentication computing platform 110 may determine to identify the first authentication request as malicious. Alternatively, if client authentication computing platform 110 determines that the one or more first distance values do not exceed the at least one predefined behavioral difference threshold and that the one or more second distance values do not exceed the at least one predefined activity difference threshold, client authentication computing platform 110 may allow the authentication request to proceed as legitimate.

In some embodiments, the first behavioral profile associated with the first user account may include channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile. For example, the first behavioral profile associated with the first user account (which client authentication computing platform 110 may, e.g., evaluate at step 233) may include channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile. These dimensions of the behavioral profile may correspond to the dimensions described in connection with the examples above and may be created and/or include information similar to that described in the examples above.

For example, in some embodiments, the channel information associated with the channels dimension of the first behavioral profile may include first channel activity information identifying actions involving the first user account across one or more internal channels and second channel activity information identifying actions involving the first user account across one or more external channels. For example, profile data that is included in and/or otherwise associated with the channels dimension of a behavioral profile may capture a user's activity across various internal channels (which may, e.g., be provided by an organization operating account portal computing platform 120, such as a financial institution) and/or external channels (which may, e.g., be provided by a different organization than the organization operating account portal computing platform 120). For instance, the internal channels may include an online banking channel, mobile banking channel, interactive voice response (IVR) channel, a contact center channel, a financial center channel, and/or other channels. The external channels may, for instance, capture interactions with other banks and/or organizations, based on data received via data sharing services and/or relationships. Any and/or all of this information may be used by client authentication computing platform 110 in calculating distance values and/or in otherwise evaluating the one or more behavioral parameters associated with the first client computing device (e.g., client computing device 160) and the first activity data at step 233.

In some embodiments, the event information associated with the events dimension of the first behavioral profile may identify at least one user-specific event that is automatically executable based on at least one trigger. For example, the event information associated with the events dimension of the first behavioral profile may identify an automatically executable event such as a lock account event (which may, e.g., prevent access to the account until the account owner visits a banking center in person), a freeze transactions event (which may, e.g., prevent further transactions on the account from being approved until the account holder unfreezes the account in online banking or via an IVR system), and/or a reset password event (which may, e.g., reset the account password). In addition, the event information associated with the events dimension of the first behavioral profile may identify one or more triggers for such events, such as a number of failed login attempts, unusual account activity, unusual portal usage activity, and/or other triggers. Any and/or all of this information may be used by client authentication computing platform 110 in calculating distance values and/or in otherwise evaluating the one or more behavioral parameters associated with the first client computing device (e.g., client computing device 160) and the first activity data at step 233.

In some embodiments, the trigger information associated with the triggers dimension of the first behavioral profile may identify at least one user-specific condition set that invokes automatic execution of at least one user-specific event. For example, the trigger information associated with the triggers dimension of the first behavioral profile may identify one or more user-specific thresholds and/or other conditions that may trigger particular events, such as execution of a first event after five failed login attempts, execution of a second event after ten failed login attempts, execution of a third event after fifteen failed login events, or the like. Any and/or all of this information may be used by client authentication computing platform 110 in calculating distance values and/or in otherwise evaluating the one or more behavioral parameters associated with the first client computing device (e.g., client computing device 160) and the first activity data at step 233.

In some embodiments, the biometric information associated with the biometrics dimension of the first behavioral profile may include biometric activity information identifying biometric login actions involving the first user account. For example, the biometric activity information may, for instance, capture user-specific biometrics (which may, e.g., include validation data associated with a particular user's authentication biometrics, a particular user's history or frequency of using particular biometrics to authenticate, and/or the like). Any and/or all of this information may be used by client authentication computing platform 110 in calculating distance values and/or in otherwise evaluating the one or more behavioral parameters associated with the first client computing device (e.g., client computing device 160) and the first activity data at step 233.

In some embodiments, the external information associated with the external dimension of the first behavioral profile may include one or more of user-specific social data or user-specific digital health data. For example, the external information associated with the external dimension of the first behavioral profile may include user-specific social data, user-specific digital health data, and/or other customer-specific data that may be evaluated for authentication purposes. For instance, the user-specific social data may include social networking handles, social feed content, personal assets identified in social feeds, social preferences such as likes and dislikes, social posting behavior, social shopping behavior, and/or the like. The user-specific digital health data may, for instance, include data captured by a customer's linked wearable device. In addition, other customer-specific data that may be evaluated for authentication purposes may, for instance, include non-customer identifiers, such as phone numbers and/or other identifiers associated with non-registered customers who utilize bank services, such as cash checking. Any and/or all of this information may be used by client authentication computing platform 110 in calculating distance values and/or in otherwise evaluating the one or more behavioral parameters associated with the first client computing device (e.g., client computing device 160) and the first activity data at step 233.

At step 234, client authentication computing platform 110 may identify the authentication request as malicious (e.g., based on calculating distance values and/or in otherwise evaluating the one or more behavioral parameters associated with client computing device 160 and the first activity data at step 233). For example, at step 234, based on evaluating the one or more behavioral parameters associated with the first client computing device (e.g., client computing device 160) and the first activity data, client authentication computing platform 110 may identify the first authentication request as malicious. In identifying the first authentication request as malicious, client authentication computing platform 110 may initiate and/or execute one or more triggered events associated with the behavioral profile and/or may evaluate the authentication event in view of one or more existing malicious-user profiles (e.g., to determine whether the authentication event is associated with a known malicious user). For example, the one or more existing malicious-user profiles may include data and/or be defined across similar dimensions as the legitimate user behavioral profiles described in connection with the examples discussed above. For instance, each malicious-user profile may include data associated with a channels dimension, an events dimension, a triggers dimension, a biometric dimension, and/or an other dimension. In addition, these dimensions of the malicious-user profiles may be used by client authentication computing platform 110 in a similar manner as with the legitimate user behavioral profiles described in connection with the examples discussed above.

In some embodiments, identifying the first authentication request as malicious may include initiating execution of one or more automatically triggered events defined by event information and trigger information associated with the first behavioral profile associated with the first user account. For example, in identifying the first authentication request as malicious at step 234, client authentication computing platform 110 may initiate execution of one or more automatically triggered events defined by event information and trigger information associated with the first behavioral profile associated with the first user account. For instance, client authentication computing platform 110 may initiate execution of one or more of the automatically triggered events described in the examples above.

In some embodiments, identifying the first authentication request as malicious may include: comparing the one or more behavioral parameters associated with the first client computing device and the first activity data to one or more malicious-user profiles; and based on comparing the one or more behavioral parameters associated with the first client computing device and the first activity data to the one or more malicious-user profiles, selecting a malicious-user profile from the one or more malicious-user profiles as a matching profile. For example, in identifying the first authentication request as malicious at step 234, client authentication computing platform 110 may compare the one or more behavioral parameters associated with the first client computing device (e.g., client computing device 160) and the first activity data to one or more malicious-user profiles. In addition, based on comparing the one or more behavioral parameters associated with the first client computing device (e.g., client computing device 160) and the first activity data to the one or more malicious-user profiles, client authentication computing platform 110 may select a malicious-user profile from the one or more malicious-user profiles as a matching profile. By selecting the malicious-user profile from the one or more malicious-user profiles as a matching profile, client authentication computing platform 110 may, for instance, confirm that the first authentication request is malicious. Additionally or alternatively, client authentication computing platform 110 may update the existing malicious-user profile based on captured details and/or other information associated with the first authentication request. In some instances, client authentication computing platform 110 may select an approximate match or a plurality of approximately matching malicious-user profiles and/or may notify one or more administrative users of such matches to flag them for additional review.

At step 235, client authentication computing platform 110 may generate one or more denial commands. For example, at step 235, based on identifying the first authentication request as malicious, client authentication computing platform 110 may generate one or more denial-of-access commands directing the account portal computing platform (e.g., account portal computing platform 120) to prevent the first client computing device (e.g., client computing device 160) from accessing the one or more secured information resources associated with the first user account.

At step 236, client authentication computing platform 110 may send the one or more denial commands to account portal computing platform 120. For example, at step 236, client authentication computing platform 110 may send, via the communication interface (e.g., communication interface 113), to the account portal computing platform (e.g., account portal computing platform 120), the one or more denial-of-access commands directing the account portal computing platform (e.g., account portal computing platform 120) to prevent the first client computing device (e.g., client computing device 160) from accessing the one or more secured information resources associated with the first user account.

Figure 5:
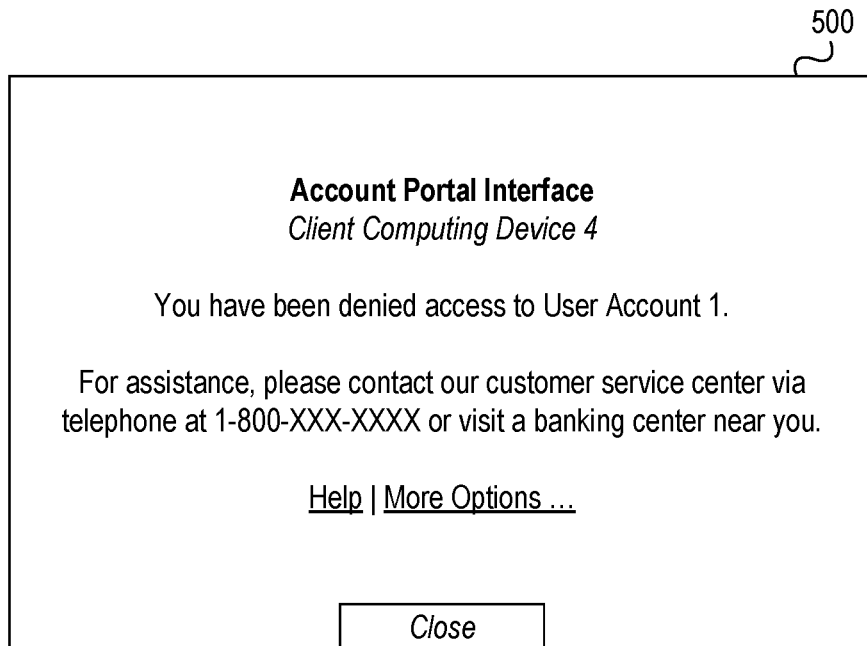

In some embodiments, sending the one or more denial-of-access commands to the account portal computing platform may cause the account portal computing platform to terminate a connection with the first client computing device. For example, by sending the one or more denial-of-access commands to the account portal computing platform (e.g., account portal computing platform 120), client authentication computing platform 110 may cause the account portal computing platform (e.g., account portal computing platform 120) to terminate a connection with the first client computing device (e.g., client computing device 160). This may, for instance, cause client computing device 160 to display and/or otherwise present a graphical user interface similar to graphical user interface 500, which is illustrated in FIG. 5. As seen in FIG. 5, graphical user interface 500 may include text and/or other information informing the user that access has been denied and/or that the session has been halted (e.g., "You have been denied access to User Account 1. For assistance, please contact our customer service center via telephone at 1-800-XXX-XXXX or visit a banking center near you.").

In some embodiments, sending the one or more denial-of-access commands to the account portal computing platform may cause the account portal computing platform to connect the first client computing device to a honeypot site. For example, by sending the one or more denial-of-access commands to the account portal computing platform (e.g., account portal computing platform 120), client authentication computing platform 110 may cause the account portal computing platform (e.g., account portal computing platform 120) to connect the first client computing device (e.g., client computing device 160) to a honeypot site. The honeypot site may, for instance, be hosted by account portal computing platform 120 and/or another server and may be configured to capture additional details from client computing device 160 without providing any access to secured user account information.

Referring to FIG. 2J, at step 237, client authentication computing platform 110 may update a malicious-user behavioral profile (e.g., associated with client computing device 160 and/or a usage pattern associated with the flagged session involving client computing device 160). For example, at step 237, client authentication computing platform 110 may update at least one malicious-user profile of a plurality of malicious-user profiles based on the one or more behavioral parameters associated with the first client computing device (e.g., client computing device 160) and the first activity data. For instance, client authentication computing platform 110 may update a matching and existing malicious-user profile if one exists; alternatively, client authentication computing platform 110 may create a new malicious-user profile if a matching and existing malicious-user profile does not already exist.

Figure 6:
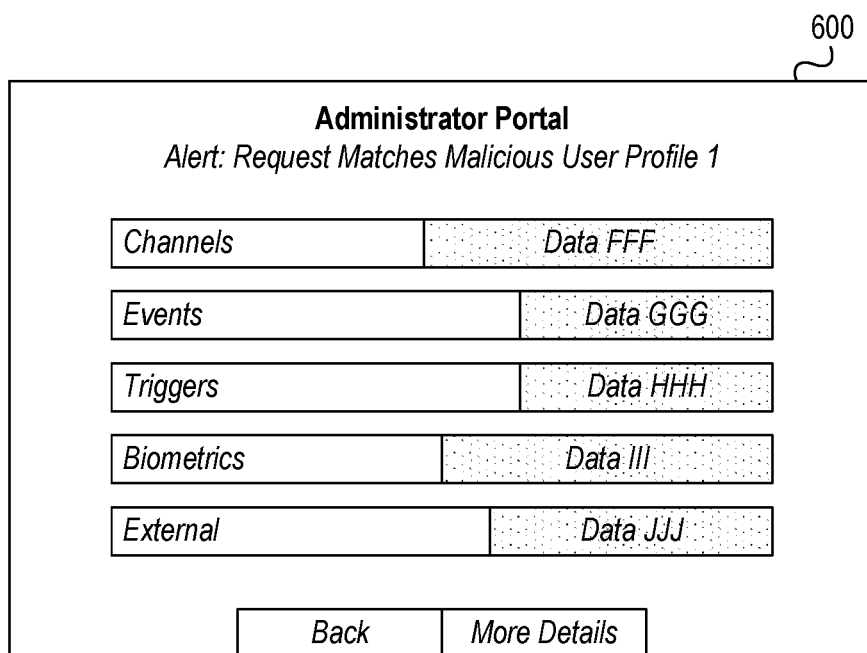

At step 238, client authentication computing platform 110 may generate one or more administrative alerts. For example, at step 238, based on identifying the first authentication request as malicious, client authentication computing platform 110 may generate one or more administrative alerts. In addition, client authentication computing platform 110 may send, via the communication interface (e.g., communication interface 113), to an administrative computing device, the one or more administrative alerts. In some instances, by sending the one or more administrative alerts to the administrative computing device, client authentication computing platform 110 may cause the administrative computing device to present at least one graphical user interface that includes information associated with at least one malicious-user profile associated with the first authentication request. For example, client authentication computing platform 110 may cause the administrative computing device to display one or more graphical user interfaces similar to graphical user interface 600, which is illustrated in FIG. 6. As seen in FIG. 6, graphical user interface 600 may include graphical content and/or other information associated with different dimensions of a malicious-user behavioral profile associated with a particular user account, such as a channels dimension, an events dimension, a triggers dimension, a biometrics dimension, and an external dimension associated with the malicious-user behavioral profile.

At step 239, client authentication computing platform 110 may generate one or more client alerts (e.g., to alert a legitimate user associated with the first user account about the attempt at unauthorized access to the user account). At step 240, client authentication computing platform 110 may send the one or more client alerts. For example, at step 240, client authentication computing platform 110 may send the one or more client alerts to client computing device 130 and/or client computing device 140, which may, for instance, by linked to the first user account, as discussed above.

Figure 7:
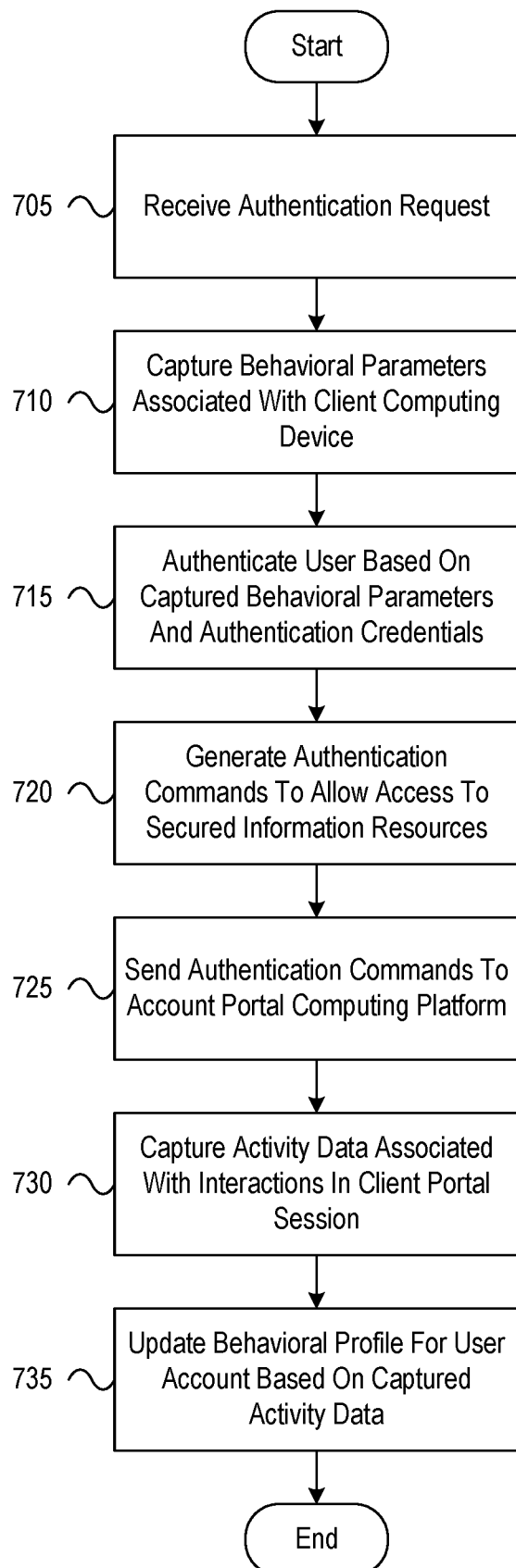
FIG. 7 depicts an illustrative method for processing authentication requests to secured information systems using machine-learned user-account behavior profiles in accordance with one or more example embodiments.

FIG. 7 depicts an illustrative method for processing authentication requests to secured information systems using machine-learned user-account behavior profiles in accordance with one or more example embodiments. Referring to FIG. 7, at step 705, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. At step 710, based on receiving the first authentication request from the account portal computing platform, the computing platform may capture one or more behavioral parameters associated with the first client computing device. At step 715, the computing platform may authenticate the first user of the first client computing device to the first user account based on the one or more behavioral parameters associated with the first client computing device and one or more authentication credentials associated with the first authentication request. At step 720, based on authenticating the first user of the first client computing device to the first user account, the computing platform may generate one or more authentication commands directing the account portal computing platform to allow access to the one or more secured information resources associated with the first user account in the first client portal session. At step 725, the computing platform may send, via the communication interface, to the account portal computing platform, the one or more authentication commands directing the account portal computing platform to allow access to the one or more secured information resources associated with the first user account in the first client portal session. At step 730, after sending the one or more authentication commands directing the account portal computing platform to allow access to the one or more secured information resources associated with the first user account in the first client portal session, the computing platform may capture first activity data associated with one or more interactions in the first client portal session. At step 735, the computing platform may update a first behavioral profile associated with the first user account based on the first activity data associated with the one or more interactions in the first client portal session.

Figure 8:
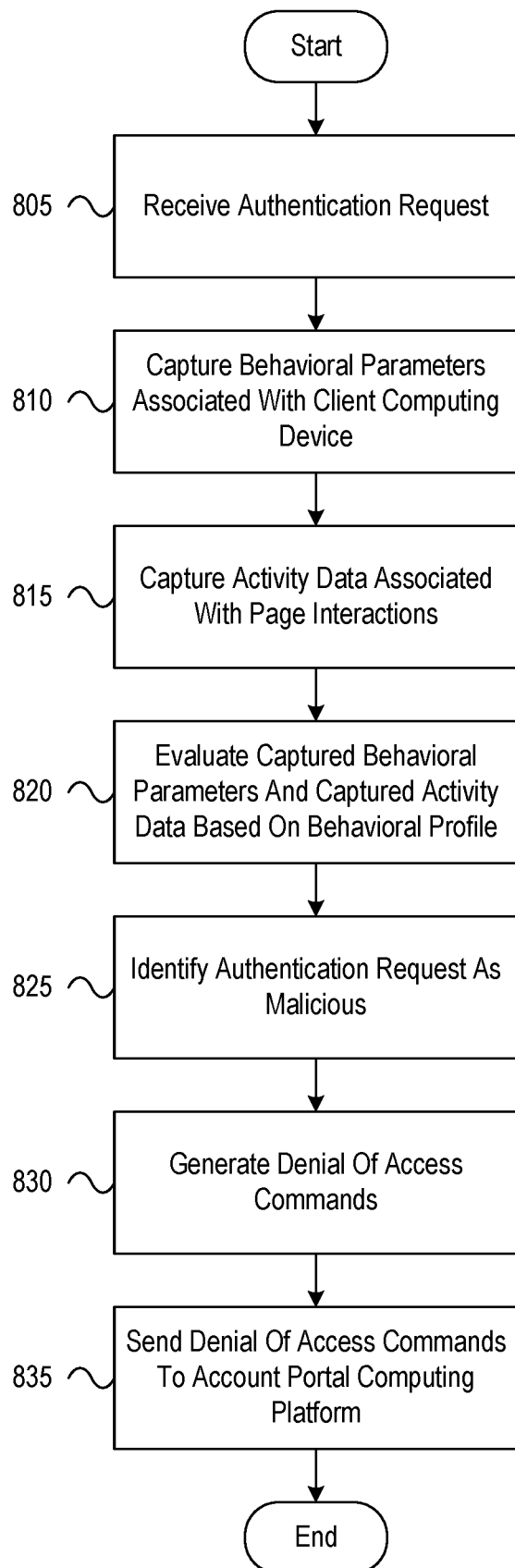
FIG. 8 depicts another illustrative method for processing authentication requests to secured information systems using machine-learned user-account behavior profiles in accordance with one or more example embodiments.

FIG. 8 depicts another illustrative method for processing authentication requests to secured information systems using machine-learned user-account behavior profiles in accordance with one or more example embodiments. Referring to FIG. 8, at step 805, a computing platform having at least one processor, a communication interface, and memory may receive, via the communication interface, from an account portal computing platform, a first authentication request corresponding to a request for a first user of a first client computing device to access one or more secured information resources associated with a first user account in a first client portal session. At step 810, based on receiving the first authentication request from the account portal computing platform, the computing platform may capture one or more behavioral parameters associated with the first client computing device. At step 815, the computing platform may capture first activity data associated with one or more interactions by the first client computing device with one or more non-authenticated pages hosted by the account portal computing platform. At step 820, the computing platform may evaluate the one or more behavioral parameters associated with the first client computing device and the first activity data based on a first behavioral profile associated with the first user account. At step 825, based on evaluating the one or more behavioral parameters associated with the first client computing device and the first activity data, the computing platform may identify the first authentication request as malicious. At step 830, based on identifying the first authentication request as malicious, the computing platform may generate one or more denial-of-access commands directing the account portal computing platform to prevent the first client computing device from accessing the one or more secured information resources associated with the first user account. At step 835, the computing platform may send, via the communication interface, to the account portal computing platform, the one or more denial-of-access commands directing the account portal computing platform to prevent the first client computing device from accessing the one or more secured information resources associated with the first user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, via the communication interface, from an account portal computing platform, a first authentication request corresponding to a request for a first user of a first client computing device to access one or more secured information resources associated with a first user account in a first client portal session;
        based on receiving the first authentication request from the account portal computing platform, capture one or more behavioral parameters associated with the first client computing device;
        capture first activity data associated with one or more interactions by the first client computing device with one or more non-authenticated pages hosted by the account portal computing platform;
        evaluate the one or more behavioral parameters associated with the first client computing device and the first activity data based on a first behavioral profile associated with the first user account;
        based on evaluating the one or more behavioral parameters associated with the first client computing device and the first activity data, identify the first authentication request as malicious;
        based on identifying the first authentication request as malicious, generate one or more denial-of-access commands directing the account portal computing platform to prevent the first client computing device from accessing the one or more secured information resources associated with the first user account; and
        send, via the communication interface, to the account portal computing platform, the one or more denial-of-access commands directing the account portal computing platform to prevent the first client computing device from accessing the one or more secured information resources associated with the first user account.

2. The computing platform of claim 1, wherein capturing the one or more behavioral parameters associated with the first client computing device comprises capturing one or more of a device identifier associated with the first client computing device, device settings information associated with the first client computing device, device location information associated with the first client computing device, or at least one network address associated with the first client computing device.

3. The computing platform of claim 1, wherein capturing the first activity data associated with the one or more interactions by the first client computing device with the one or more non-authenticated pages hosted by the account portal computing platform comprises receiving information identifying one or more requests received from the first client computing device, information identifying an order of the one or more requests received from the first client computing device, and information identifying a timing of the one or more requests received from the first client computing device.

4. The computing platform of claim 1, wherein evaluating the one or more behavioral parameters associated with the first client computing device and the first activity data based on the first behavioral profile associated with the first user account comprises:
    calculating one or more first distance values between the one or more behavioral parameters associated with the first client computing device and corresponding parameters of the first behavioral profile;
    calculating one or more second distance values between one or more activity parameters associated with the first activity data and corresponding parameters of the first behavioral profile;
    comparing the one or more first distance values to at least one predefined behavioral difference threshold;
    comparing the one or more second distance values to at least one predefined activity difference threshold;
    determining that the one or more first distance values exceed the at least one predefined behavioral difference threshold or that the one or more second distance values exceed the at least one predefined activity difference threshold; and
    responsive to determining that the one or more first distance values exceed the at least one predefined behavioral difference threshold or that the one or more second distance values exceed the at least one predefined activity difference threshold, determining to identify the first authentication request as malicious.

5. The computing platform of claim 1, wherein the first behavioral profile associated with the first user account comprises channel information associated with a channels dimension of the first behavioral profile, event information associated with an events dimension of the first behavioral profile, trigger information associated with a triggers dimension of the first behavioral profile, biometric information associated with a biometrics dimension of the first behavioral profile, and external information associated with an external dimension of the first behavioral profile.

6. The computing platform of claim 5, wherein the channel information associated with the channels dimension of the first behavioral profile comprises first channel activity information identifying actions involving the first user account across one or more internal channels and second channel activity information identifying actions involving the first user account across one or more external channels.

7. The computing platform of claim 5, wherein the event information associated with the events dimension of the first behavioral profile identifies at least one user-specific event that is automatically executable based on at least one trigger.

8. The computing platform of claim 5, wherein the trigger information associated with the triggers dimension of the first behavioral profile identifies at least one user-specific condition set that invokes automatic execution of at least one user-specific event.

9. The computing platform of claim 5, wherein the biometric information associated with the biometrics dimension of the first behavioral profile comprises biometric activity information identifying biometric login actions involving the first user account.

10. The computing platform of claim 5, wherein the external information associated with the external dimension of the first behavioral profile comprises one or more of user-specific social data or user-specific digital health data.

11. The computing platform of claim 1, wherein identifying the first authentication request as malicious comprises initiating execution of one or more automatically triggered events defined by event information and trigger information associated with the first behavioral profile associated with the first user account.

12. The computing platform of claim 1, wherein identifying the first authentication request as malicious comprises:
  comparing the one or more behavioral parameters associated with the first client computing device and the first activity data to one or more malicious-user profiles; and
  based on comparing the one or more behavioral parameters associated with the first client computing device and the first activity data to the one or more malicious-user profiles, selecting a malicious-user profile from the one or more malicious-user profiles as a matching profile.

13. The computing platform of claim 1, wherein sending the one or more denial-of-access commands to the account portal computing platform causes the account portal computing platform to terminate a connection with the first client computing device.

14. The computing platform of claim 1, wherein sending the one or more denial-of-access commands to the account portal computing platform causes the account portal computing platform to connect the first client computing device to a honeypot site.

15. The computing platform of claim 1, wherein the memory stores additional computer-readable instructions that, when executed by the at least one processor, cause the computing platform to:
  update at least one malicious-user profile of a plurality of malicious-user profiles based on the one or more behavioral parameters associated with the first client computing device and the first activity data.

16. The computing platform of claim 1, wherein the memory stores additional computer-readable instructions that, when executed by the at least one processor, cause the computing platform to:
  based on identifying the first authentication request as malicious, generate one or more administrative alerts; and
  send, via the communication interface, to an administrative computing device, the one or more administrative alerts, wherein sending the one or more administrative alerts to the administrative computing device causes the administrative computing device to present at least one graphical user interface comprising information associated with at least one malicious-user profile associated with the first authentication request.

17. A method, comprising:
  at a computing platform comprising at least one processor, a communication interface, and memory:
    receiving, by the at least one processor, via the communication interface, from an account portal computing platform, a first authentication request corresponding to a request for a first user of a first client computing device to access one or more secured information resources associated with a first user account in a first client portal session;
    based on receiving the first authentication request from the account portal computing platform, capturing, by the at least one processor, one or more behavioral parameters associated with the first client computing device;
    capturing, by the at least one processor, first activity data associated with one or more interactions by the first client computing device with one or more non-authenticated pages hosted by the account portal computing platform;
    evaluating, by the at least one processor, the one or more behavioral parameters associated with the first client computing device and the first activity data based on a first behavioral profile associated with the first user account;
    based on evaluating the one or more behavioral parameters associated with the first client computing device and the first activity data, identifying, by the at least one processor, the first authentication request as malicious;
    based on identifying the first authentication request as malicious, generating, by the at least one processor, one or more denial-of-access commands directing the account portal computing platform to prevent the first client computing device from accessing the one or more secured information resources associated with the first user account; and
    sending, by the at least one processor, via the communication interface, to the account portal computing platform, the one or more denial-of-access commands directing the account portal computing platform to prevent the first client computing device from accessing the one or more secured information resources associated with the first user account.

18. The method of claim 17, wherein capturing the one or more behavioral parameters associated with the first client computing device comprises capturing one or more of a device identifier associated with the first client computing device, device settings information associated with the first client computing device, device location information associated with the first client computing device, or at least one network address associated with the first client computing device.

19. The method of claim 17, wherein capturing the first activity data associated with the one or more interactions by the first client computing device with the one or more non-authenticated pages hosted by the account portal computing platform comprises receiving information identifying one or more requests received from the first client computing device, information identifying an order of the one or more requests received from the first client computing device, and information identifying a timing of the one or more requests received from the first client computing device.

20. One or more non-transitory computer-readable media storing instructions that, when executed by a computing platform comprising at least one processor, a communication interface, and memory, cause the computing platform to:
  receive, via the communication interface, from an account portal computing platform, a first authentication request corresponding to a request for a first user of a first client computing device to access one or more secured information resources associated with a first user account in a first client portal session;

based on receiving the first authentication request from the account portal computing platform, capture one or more behavioral parameters associated with the first client computing device;

capture first activity data associated with one or more interactions by the first client computing device with one or more non-authenticated pages hosted by the account portal computing platform;

evaluate the one or more behavioral parameters associated with the first client computing device and the first activity data based on a first behavioral profile associated with the first user account;

based on evaluating the one or more behavioral parameters associated with the first client computing device and the first activity data, identify the first authentication request as malicious;

based on identifying the first authentication request as malicious, generate one or more denial-of-access commands directing the account portal computing platform to prevent the first client computing device from accessing the one or more secured information resources associated with the first user account; and send, via the communication interface, to the account portal computing platform, the one or more denial-of-access commands directing the account portal computing platform to prevent the first client computing device from accessing the one or more secured information resources associated with the first user account.

* * * * *